United States Patent
Seil et al.

(10) Patent No.: US 7,930,004 B2
(45) Date of Patent: *Apr. 19, 2011

(54) HOLDER, ELECTRICAL SUPPLY, AND RF TRANSMITTER UNIT FOR ELECTRONIC DEVICES

(75) Inventors: Oliver Duncan Seil, Pasadena, CA (US); Jeffrey David Meyers, Rochester, NY (US); Vijendra Nalwad, Newbury Park, CA (US); Thorben Neu, Los Angeles, CA (US); Ernesto Victor Quinteros, Los Angeles, CA (US); Ian Sinclair, Indian Falls, NY (US); John F. Wadsworth, Los Angeles, CA (US)

(73) Assignee: Belkin International, Inc., Playa Vista, CA (US)

( * ) Notice: Subject to any disclaimer, the term of this patent is extended or adjusted under 35 U.S.C. 154(b) by 844 days.

This patent is subject to a terminal disclaimer.

(21) Appl. No.: 11/842,921

(22) Filed: Aug. 21, 2007

(65) Prior Publication Data

US 2008/0051160 A1    Feb. 28, 2008

Related U.S. Application Data

(63) Continuation of application No. 10/936,356, filed on Sep. 8, 2004, now Pat. No. 7,292,881.

(51) Int. Cl.
*H04M 1/00* (2006.01)
*H04B 1/38* (2006.01)

(52) U.S. Cl. .................................. 455/575.1; 455/90.3
(58) Field of Classification Search ............... 455/575.1, 455/90.3, 572–573, 575.9, 344–345, 517, 455/66.1, 426.1, 454, 74.1, 88, 569.1–569.2, 455/557, 41.2, 68.1, 571; 340/539.11
See application file for complete search history.

(56) References Cited

U.S. PATENT DOCUMENTS

| | | | | |
|---|---|---|---|---|
| 5,387,136 A | * | 2/1995 | Britton | 439/668 |
| 5,642,402 A | | 6/1997 | Vilmi et al. | |
| 5,769,369 A | | 6/1998 | Meinel | |
| 5,839,919 A | * | 11/1998 | Chen | 439/529 |
| 5,860,824 A | | 1/1999 | Fan | |
| 5,860,924 A | * | 1/1999 | Quistgaard | 600/441 |
| 5,967,851 A | | 10/1999 | Ozer et al. | |

(Continued)

FOREIGN PATENT DOCUMENTS

AU    2003281564    2/2004

(Continued)

OTHER PUBLICATIONS

European Search Report for Application No. 05255528.1; Apr. 26, 2007; 8 pages. European Search Report for Application No. 08006244.1-1246; May 23, 2008; 7 pages.
European Search Report for Application No. 08006246.6-1246; May 27, 2008; 7 pages.
Specification Sheets from STMicroelectronics N.V.; Part Nos. ST72260G, ST72262G, and ST 72264G http://www.st.com/stonline/books/pdf/docs/8347.pdf (Jun. 2004).
Specification Sheets from Rohm Co., Ltd, Wireless Audio Link IC, Part No. BH1415F http://www.rohm.com/products/databook/audio/pdf/bh1415f.pdf, no date listed.

(Continued)

*Primary Examiner* — Melody Mehrpour
(74) *Attorney, Agent, or Firm* — Bryan Cave LLP

(57) ABSTRACT

A holder, electrical supply, and optional radio frequency transmitter unit to hold, supply power to, and receive a data signal from an operating electronic device when the device (e.g., MP3 player) is held in the unit is disclosed. Electrical power enters the unit's power acquisition portion (e.g., cigarette lighter adapter) from an external source and flows to the electronic device via the holder. A data signal from the electronic device is processed by an radio frequency transmitter in the unit, and the resulting radio frequency signal is broadcast by an antenna (e.g., gooseneck) that preferably forms a repositionable mechanical connection between the holder and the power acquisition unit.

47 Claims, 23 Drawing Sheets

U.S. PATENT DOCUMENTS

| | | | |
|---|---|---|---|
| 6,052,603 A | 4/2000 | Kinzalow et al. | |
| 6,075,999 A | 6/2000 | Vilmi et al. | |
| 6,140,934 A * | 10/2000 | Lam | 340/815.4 |
| 6,157,163 A * | 12/2000 | Blackwood | 320/115 |
| 6,158,793 A * | 12/2000 | Castro | 296/1.07 |
| 6,236,938 B1 * | 5/2001 | Atkinson et al. | 701/214 |
| 6,240,297 B1 * | 5/2001 | Jadoul | 455/466 |
| 6,292,440 B1 * | 9/2001 | Lee | 369/7 |
| 6,304,764 B1 * | 10/2001 | Pan | 455/569.2 |
| 6,396,769 B1 * | 5/2002 | Polany | 367/131 |
| 6,480,377 B2 * | 11/2002 | Genest et al. | 361/679.43 |
| 6,492,792 B1 * | 12/2002 | Johnson et al. | 320/136 |
| 6,539,358 B1 * | 3/2003 | Coon et al. | 704/275 |
| 6,591,085 B1 * | 7/2003 | Grady | 455/42 |
| 6,633,231 B1 * | 10/2003 | Okamoto et al. | 340/539.11 |
| 6,657,654 B2 * | 12/2003 | Narayanaswami | 348/14.04 |
| 6,728,375 B1 | 4/2004 | Palett et al. | |
| 6,788,528 B2 * | 9/2004 | Enners | 361/679.41 |
| 6,842,356 B2 | 1/2005 | Hsu | |
| 7,020,500 B2 * | 3/2006 | Saghbini | 455/571 |
| 7,062,300 B1 * | 6/2006 | Kim | 455/569.1 |
| 7,197,584 B2 * | 3/2007 | Huber et al. | 710/72 |
| 7,259,793 B2 * | 8/2007 | Manico et al. | 348/373 |
| 7,292,881 B2 * | 11/2007 | Seil et al. | 455/575.1 |
| 7,315,260 B1 * | 1/2008 | Lam et al. | 341/22 |
| 7,338,328 B2 | 3/2008 | Krieger et al. | |
| 7,445,478 B2 * | 11/2008 | Chuang | 439/165 |
| 7,522,905 B2 * | 4/2009 | Hammad et al. | 455/410 |
| 7,647,129 B1 * | 1/2010 | Griffin, Jr. | 700/94 |
| 2002/0029091 A1 | 3/2002 | Seno et al. | |
| 2002/0098813 A1 * | 7/2002 | Likourezos et al. | 455/93 |
| 2002/0155864 A1 * | 10/2002 | Wang | 455/566 |
| 2003/0003876 A1 * | 1/2003 | Rumsey | 455/74 |
| 2003/0021087 A1 * | 1/2003 | Lunsford | 361/686 |
| 2003/0033214 A1 * | 2/2003 | Mikkelsen et al. | 705/26 |
| 2004/0058649 A1 * | 3/2004 | Grady | 455/42 |
| 2004/0087335 A1 * | 5/2004 | Peiker | 455/556.2 |
| 2004/0204163 A1 * | 10/2004 | Ou | 455/569.1 |
| 2004/0221007 A1 * | 11/2004 | Roe et al. | 709/203 |
| 2005/0047071 A1 * | 3/2005 | Tse Chun Hin | 361/683 |
| 2005/0215285 A1 | 9/2005 | Lin | |
| 2006/0028479 A1 * | 2/2006 | Chun et al. | 345/531 |
| 2006/0087936 A1 * | 4/2006 | Bart | 369/47.1 |
| 2006/0105722 A1 * | 5/2006 | Kumar | 455/90.3 |
| 2006/0116009 A1 * | 6/2006 | Langberg et al. | 439/76.1 |
| 2006/0236014 A1 * | 10/2006 | Yin et al. | 710/303 |
| 2007/0050061 A1 * | 3/2007 | Klein et al. | 700/94 |
| 2007/0054550 A1 | 3/2007 | Cuthbert et al. | |
| 2007/0093264 A1 * | 4/2007 | Srinivasan et al. | 455/556.1 |
| 2007/0093277 A1 * | 4/2007 | Cavacuiti et al. | 455/566 |
| 2009/0009936 A1 * | 1/2009 | Neu et al. | 361/679 |
| 2009/0186583 A1 * | 7/2009 | Seil et al. | 455/66.1 |
| 2010/0273421 A1 * | 10/2010 | Tu et al. | 455/41.2 |

FOREIGN PATENT DOCUMENTS

| | | |
|---|---|---|
| CA | 2240877 | 9/1999 |
| CA | 2358408 | 7/2000 |
| EP | 0949771 | 10/1999 |
| GB | 2361828 | 10/2001 |
| JP | H6-309854 | 11/1994 |
| JP | 11298390 | 10/1999 |
| JP | 3-51727 | 6/2000 |
| JP | P2002-178857 A | 6/2002 |
| KR | 10-2000-0044029 | 7/2000 |
| WO | WO 0041320 | 7/2000 |
| WO | WO 2004 008649 | 1/2004 |
| WO | WO 2004/008649 | 1/2004 |
| WO | WO 2004010594 | 1/2004 |
| WO | 2007009122 | 1/2007 |

OTHER PUBLICATIONS

Specification Sheets from Texas Instruments Incorporated Part Nos. TL750L, TL751L http://focus.ti.com/lit/ds/symlink/tl750105.pdf (Aug. 2003).

Specification Sheets from National Semiconductor Corp. Part No. LM3351 http://cache.national.com/ds/LM/LM3351.pdf (Dec. 1999).

Specification Sheets from Formosa Inductor Corp. Part No. T9X5X3-2.0mH (Jul. 27, 2004).

CD Mount website (BC001-BC002).

Arkon website #1 (BC003-BC004).

Arkon website #2 (BC005-BC006).

Technical Support (BC007-BC009).

Arkon website #3 (BC00010).

Arkon website #4 (BC00011-BC00012).

Arkon Sound Feeder Portable Audio Adapter (BC00013-BC00014).

Arkon SF100 (BC00015-BC00016).

Priority Tech website.

Description of Auto Kit for iPod With Dock Connector, Part No. F8V7058-APL, Belkin Corp. (www.belkin.com) http://catalog.belkin.com/IWCatProductPage.process?/Merhant_Id=1&Section_Id=&pcount=&Product_Id=149006, no date listed.

Description of TuneCast II Mobile FM Transmitter, Part No. F8V3080, Belkin Corp. (www.belkin.com) http://catalog.belkin.com/IWCatProductPage.process?Merchant_Id=1&Section_Id=&pcount=&Product_Id=140984, no date listed.

Review of Griffin RoadTrip All-in-One Car Solution by Griffin Technology, Inc. (www.ipodlounge.com) http://www.ipodlounge.com/reviews_more.php?id+4733_0_6_0_C (Aug. 17, 2004).

Review of DLO TransPod by Digital Lifestyle Outfitters (wvvw.ipodlounge.com) http://www.ipodlounge.com/reviews_more._php?id-948_0_6_0_M (Jul. 24, 2003).

LCD Digital Transmitter for New iPod 2.0 § User's Manual by Griffin Technology Inc., no date listed.

Universal Wireless Phone Car Mount & iPod Solutions sold by Arkon Resources, Inc. (www.arkon.com) http://www.arkon.com/phonemounts.html, no date listed.

iPod Accessories from Apple Computer, Inc. (www.apple.com) http://www.apple.com/ipod/accessories.html, no date listed.

Obedient Flexible Steel Tubing (Goosenecks), Uniprise International Incorporated http://www.thomasregister.com/olc/66791252/ (2004), no date listed.

Search Report from PCT/US2010/046093, 15 pages, Nov. 4, 2010.

* cited by examiner

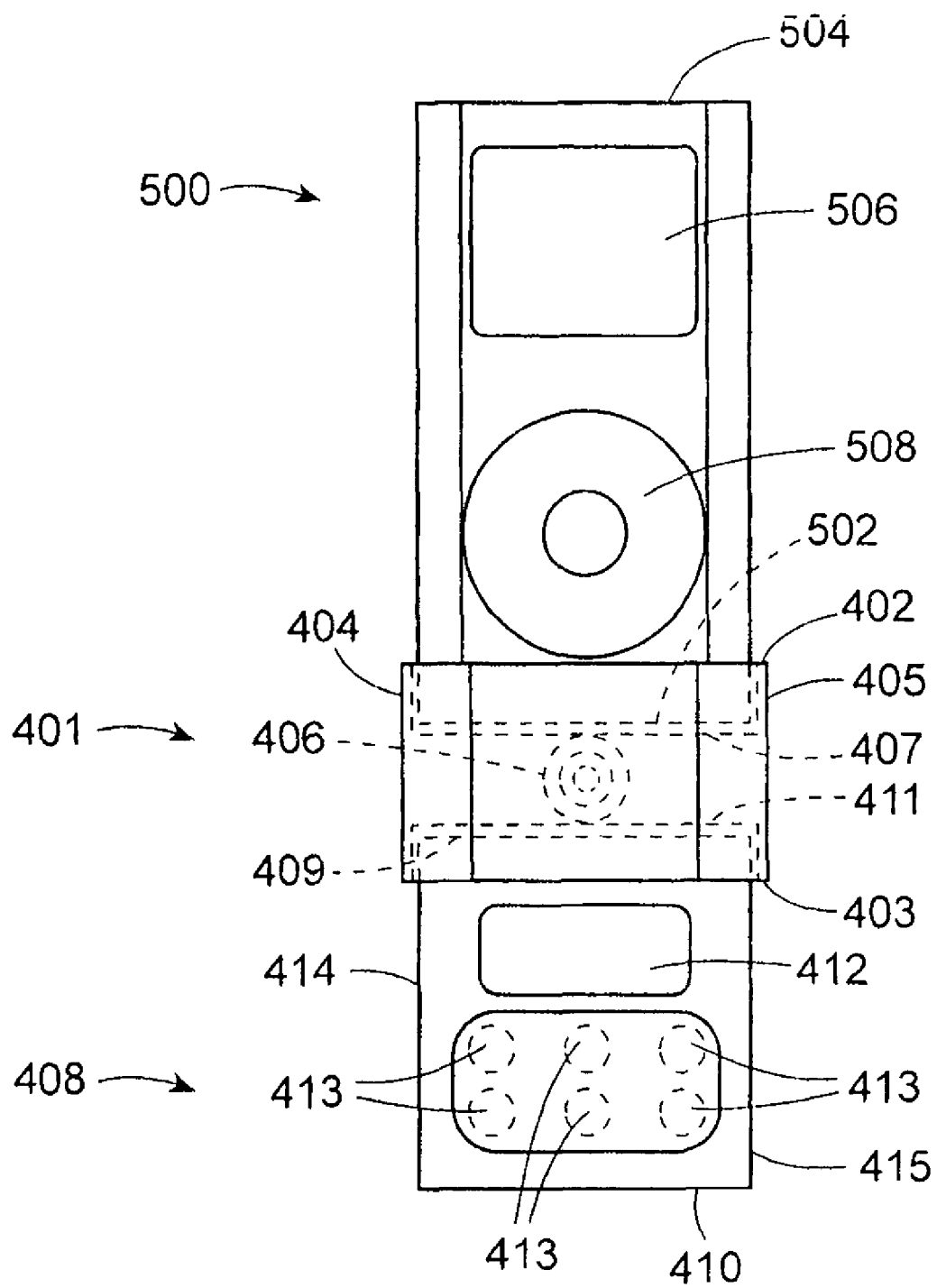

HOLDER, ELECTRICAL SUPPLY, AND RF TRANSMITTER UNIT FOR ELECTRONIC DEVICES

CROSS REFERENCE TO RELATED APPLICATIONS

This application is a continuation application of U.S. patent application Ser. No. 10/936,356, filed Sep. 8, 2004 now U.S. Pat. No. 7,292,881 to Seil et al. U.S. patent application Ser. No. 10/936,356 is incorporated herein by reference.

BACKGROUND OF THE INVENTION

1. Field of the Invention

This invention relates to accessories for electronic devices, particularly audio devices (e.g., portable MP3 players). More specifically, the invention relates to a holder, electrical (power) supply, and optional RF transmitter unit for electronic devices.

2. Description of the Background

Numerous types of electronic devices are known, many of which are portable, for example, mobile (or cellular) phones, laptop computers, and audio playback devices, for example, portable AM and FM radios, portable CD (compact disk) players, and portable MP3 (MPEG Audio Layer-3) players. The term "electronic device" should be broadly understood and includes electronic devices of all types and designs.

MP3 format is a compressed format for digital music. Use of MP3 format reduces the size of digitized music files without degrading or distorting acoustic sound quality. Music is sometimes converted to MP3 format and made available on the Internet. Such MP3 files can be downloaded from the Internet using a computer and special software. A computer with the appropriate capability and software can convert digital music from a CD into MP3 format. MP3 files are commonly played in three different ways: (i) MP3 files can be played directly on a computer that contains the requisite software, (ii) MP3 files can be decompressed and recorded onto a CD, which can then be played, and (iii) MP3 files can be played on an MP3 player.

Portable MP3 players are relatively small, light-weight devices that can interface with a computer. Typically, a user downloads MP3 files from the Internet onto a computer and then loads the MP3 files onto the MP3 player. The MP3 player is connected to the computer's parallel or USB port, which allows the MP3 player to interface with the computer and receive the MP3 files.

There are many portable MP3 players available, including those manufactured by Sony Corp., Philips Corp., Audiovox Corp., and Apple Computer, Inc. (e.g., Apple Computer's iPod MP3 player and iPod mini MP3 player). MP3 players rely on batteries for their portability and typically utilize headsets or ear phones for user listening. Battery life is sometimes a problem. After a few hours of playing time, most MP3 players need an alternate power source, need to be charged, or need to have their batteries replaced. Another limitation is that these MP3 players typically playback sound for only one listener at a time (e.g., via headset or ear phones). Even if the MP3 player is equipped with a speaker, the player's small size and light-weight design limit the size of the speaker, which tends to make the speaker inadequate for transmitting music to a group of people, e.g., in a vehicle.

MP3 player accessories that attempt to overcome these limitations are available, for example, units to supply power to the MP3 player for operation and/or charging (e.g., Auto Kit For iPod With Dock Connector, Part No. F8V7058-APL, from Belkin Corp.) and FM transmission systems (e.g., TuneCast II Mobile FM Transmitter, Part No. F8V3080-APL, from Belkin Corp.). An FM transmission system when used in conjunction with an MP3 player allows the user to play MP3 music files stored on the MP3 player through an FM audio system so that one can listen and allow others to listen to the stored music. However, current FM transmission systems are often unstable and provide weak FM signals, which can result in loss of signal or constant static hiss in the background. In such known FM transmission systems, the FM signal strength is sometimes weakened or lost because of inefficient antenna design (e.g., concerning its size, shape, and/or location).

Some known accessory units combine power supply and charging circuitry with an FM transmission system. Some of these devices are capable of use in vehicles by means of a cigarette lighter adapter (e.g., U.S. Pat. No. 6,591,085, U.S. Patent Application Publication No. 2004/0058649, International Application Publication No. WO 2004/010594, and International Application Publication No. WO 2004/008649). The current devices available, however, are often bulky, mechanically unstable, lack versatility, produce weak FM signals, yield noisy audio output from the FM receiver (e.g., audio output with noticeable hiss), and sacrifice user comfort and convenience. (All of the documents, including patent documents and product specification sheets, are incorporated herein in their entireties for all purposes.)

Broadly speaking, accessories for electronic devices have included various features that attempt to improve reliability, stability, portability, and/or functionality. Some of these features include: multiple preset buttons for user convenience; concealed buttons under a single smooth resilient thin outside surface, which reduces the danger of dirt getting stuck between the buttons (as in, for example, some cell phones and microwave ovens); goosenecks, which allow for increased maneuverability of the devices; and swivel joints, which also allow for increased maneuverability of the devices.

Despite all of this, however, the need still remains for a versatile holder and power supply unit, desirably with RF (e.g., FM) transmission capabilities, for electronic devices (e.g., MP3 players) so that one can easily utilize the full breadth of the capabilities of the electronic devices. In the case of MP3 players, such units desirably would allow the user (and desirably others also) to listen to the music stored on the MP3 players. The need also exists for such units that allow the electronic devices (e.g., MP3 players) to charge, even if the units contain no charging circuitry. The need also exists for such units that are stable, light-weight, have rigid but adjustable positioning elements, and/or are portable so that they can be used, for example, in vehicles. The need also exists for such units that, when designed for use in, for example, vehicles, can accommodate a variety of cigarette lighter outlets (power supply outlets), locations, and sizes and allow easy repositioning of the electronic device (e.g., MP3 player) for the comfort and convenience of the driver and/or passengers. The need also exists for such units that produce a stronger and cleaner (e.g., more accurate and/or lower noise) signal, e.g., to provide or make possible a higher signal-to-noise ratio in the audio output. The need also exists for such units that are aesthetically pleasing to the eye, for example, that are sleek and modern looking. Finally, the need also exists for such units that are superior in comfort, convenience, and/or electrical capabilities when mounting, powering, and/or otherwise using the units, but without sacrificing portability, stability, versatility, and/or aesthetics.

BRIEF SUMMARY OF THE INVENTION

An invention that satisfies one or more of those needs and overcomes one or more of those problems has now been developed. Broadly, in one aspect, the invention concerns a holder, electrical supply, and RF transmitter unit to hold, supply power to, and receive a data (e.g., audio) signal (i.e., at least one data signal) from an electronic device (e.g., MP3 player) when the electronic device is being held in the unit and is operating; the unit being capable of converting the data signal to an RF signal and transmitting the RF signal to an RF receiver; power being available to the unit from a source external to the unit when the unit is being used; the electronic device having at least one power input connector through which input power for the electronic device passes when the electronic device is held in the unit and is operating and at least one data signal output connector through which a data output signal passes from the electronic device when the electronic device is held in the unit and is operating; the electronic device also having a top, a bottom, and a bottom portion extending from the bottom of the device towards the top of the device; the unit comprising:

(a) an RF transmitter;

(b) a holder for the electronic device, the RF transmitter being mechanically coupled to the holder, the holder having a power coupling to transmit power to the at least one power input connector of the electronic device and also having a signal coupling to transmit the data output signal from the at least one data signal output connector of the electronic device to the RF transmitter, the RF transmitter converting the data output signal (as is or as it may possibly have been modified prior to entering the RF transmitter) to an RF signal;

(c) a power acquisition sub-unit that is electrically coupled to the power coupling of the holder and that is electrically and mechanically coupled to the external power source when the unit is being used to transmit power from the external power source to the power coupling of the holder; and (d) a connector mechanically coupling the holder to the power acquisition sub-unit, which connector comprises a semi-rigid elongate metallic antenna portion that allows the position of the holder to be semi-permanently adjusted relative to the position of the power acquisition sub-unit and that is electrically coupled to the RF transmitter to receive the RF signal and radiate it so that it can be received by the RF receiver.

In another aspect, the invention concerns a holder and electrical supply unit to hold and supply power to an electronic device (e.g., MP3 player) when the electronic device is being held in the unit and is operating; power being available to the unit from a source external to the unit when the unit is being used; the electronic device providing a data (e.g., audio) output signal (i.e., at least one data output signal) when the electronic device is operating and having at least one power input connector through which input power for the electronic device passes when the electronic device is held in the unit and is operating; the electronic device also having a top, a bottom, and a bottom portion extending from the bottom of the device towards the top of the device; the unit comprising:

(a) a holder for the electronic device, the holder having a power coupling to transmit power to the at least one power input connector of the electronic device;

(b) a power acquisition sub-unit that is electrically coupled to the power coupling of the holder and that is electrically and mechanically coupled to the external power source when the unit is being used to transmit power from the external power source to the power coupling of the holder;

(c) a connector mechanically coupling the holder to the power acquisition sub-unit, which connector comprises a semi-rigid elongate portion that allows the position of the holder to be semi-permanently adjusted relative to the position of the power acquisition sub-unit; and (d) wherein at least one of (i) and (ii) obtains (i.e., exists, is the case, or is applicable):

(i) the semi-rigid elongate portion of the connector comprises a gooseneck; and/or (ii) the power acquisition sub-unit comprises a cigarette lighter adapter having a housing with a distal end (i.e., the end farther from the user when the power acquisition sub-unit is being inserted into a power source such as a cigarette lighter), a proximal end (i.e., the end closer to the user when the power acquisition sub-unit is being inserted into a power source such as a cigarette lighter), and a length running from the distal end to the proximal end, the distal end being adapted for insertion into and positioning within a cigarette lighter, the cigarette lighter having a depth and an inner circumference, the cigarette lighter adapter further comprising a deformable resilient member having an outer circumference, the deformable resilient member being mounted (semi-permanently or otherwise) on the cigarette lighter adapter near the distal end so that its outer circumference is generally perpendicular to the length of the housing, the outer circumference of the deformable resilient member being larger than the inner circumference of the cigarette lighter so that pushing the distal end of the cigarette lighter adapter into the cigarette lighter causes the outer circumference of the deformable resilient member to bend away from the distal end of the cigarette lighter adapter and towards the proximal end of the cigarette lighter adapter while at least some of the deformable resilient member even after such deformation continues to push against the inner circumference of the cigarette lighter.

In another aspect, the invention concerns a power acquisition unit for electrically coupling to an electronic device and that is electrically and mechanically coupled to an external power source when the unit is being used to transmit power from the external power source to the electronic device, the power acquisition unit comprising a cigarette lighter adapter having a housing with a distal end, a proximal end, and a length running from the distal end to the proximal end, the distal end being adapted for insertion into and positioning within a cigarette lighter (e.g., the cigarette lighter of a vehicle), the cigarette lighter having a depth and an inner circumference, the cigarette lighter adapter further comprising a deformable resilient member having an outer circumference, the deformable resilient member being mounted (semi-permanently or otherwise) on the cigarette lighter adapter near the distal end so that its outer circumference is generally perpendicular to the length of the housing, the outer circumference of the deformable resilient member being larger than the inner circumference of the cigarette lighter so that pushing the distal end of the cigarette lighter adapter into the cigarette lighter causes the outer circumference of the deformable resilient member to bend away from the distal end of the cigarette lighter adapter and towards the proximal end of the cigarette lighter adapter while at least some of the deformable resilient member even after such deformation continues to push against the inner circumference of the cigarette lighter.

In another aspect, the invention concerns a power supply and support apparatus for an electronic device, the apparatus comprising the foregoing power acquisition unit and a support member coupled to the power acquisition unit, the support member comprising a semi-rigid elongate portion that allows the position of the electronic device to be semi-permanently adjusted relative to the position of the power acquisition unit.

In another aspect, the invention concerns a holder for an electronic device comprising an inner housing comprising two or more inner housing sections and an outer piece that fits over the inner housing sections to hold the inner housing sections in close fitting alignment with each other, the holder also having a cavity for receiving and releasably holding the electronic device, the electronic device having a top, a bottom, and a bottom portion extending from the bottom of the device towards the top of the device, the cavity being defined by at least a bottom wall and a sidewall, the sidewall fitting around the electronic device to help retain the electronic device within the cavity.

In another aspect, the invention concerns an RF transmission system comprising a gooseneck metallic member as the antenna, the gooseneck desirably (but not necessarily) also functioning as a structural (e.g., support) member.

In other embodiments, one or more of the following preferably obtain (i.e., exist, are the case, or are applicable): the RF (radio frequency) transmitter (e.g., FM transmitter) is removably coupled to the holder and/or can be directly connected to the electronic device to receive a data output signal therefrom (i.e., at least one data output signal) for modulation (as is or as it may possibly be modified prior to modulation) onto a carrier wave; and/or the RF transmitter is at least partially or wholly within the holder; and/or the holder comprises an inner housing comprising two or more inner housing sections and an outer piece that fits over the inner housing sections to hold them in close fitting alignment with each other, optionally defining at least one inner cavity between the inner housing sections; and/or the RF transmitter is located in the inner cavity; and/or the holder has one or more controls for changing the carrier frequency on which the RF transmitter operates and the one or more controls (which comprise, e.g., buttons of any type) are located at least partially in the inner cavity; and/or the controls can be actuated through an opening in the major face of the outer piece; and/or the buttons are all covered by a thin membrane, the membrane desirably carrying indicia on its outer surface to indicate the functions of the buttons; and/or the unit (e.g., the holder portion of the unit) has a display (e.g., an indicator light or a liquid crystal display (LCD)) for indicating the function and/or status of the unit; and/or the holder has a cavity for receiving and holding at least the bottom of the electronic device; and/or the cavity is defined by at least a bottom wall and a sidewall, the sidewall fitting around at least the bottom portion of the electronic device to help retain the electronic device within the cavity; and/or the top of the sidewall extends up to 30 millimeters (preferably 5 to 25 millimeters) above the bottom wall of the cavity; and/or the holder comprises a shallow cavity (e.g., the depth of the cavity being not more than one-third of the longer of the length and width of the cavity) for receiving and releasably holding the bottom portion of the electronic device, the electronic device when in the holder being held only by its bottom portion; and/or the cavity is defined at least in part by one or more biasing members (e.g., deformable members such as crush bars or spring-loaded balls in sockets) extending into the cavity (e.g., on the bottom wall, top wall, or sidewall of the cavity) that push against the electronic device when the electronic device is located in the cavity and that help retain the electronic device within the cavity; and/or the holder and/or its cavity has one or more protruding members (e.g., attached to the bottom wall and extending away therefrom) and the electronic device has one or more mating concavities (e.g., having their respective openings in the bottom of the device), the one or more protruding members extending into the corresponding mating concavities of the electronic device when the electronic device is held in the unit, the protruding members being, e.g., alignment pins or a power and/or signal coupling (e.g., a male or female multi-pin (e.g., 30-pin) connector); and/or the holder has a display for indicating the carrier frequency of the RF signal; and/or the unit (e.g., the holder) has at least one control for changing the carrier frequency on which the RF transmitter operates; and/or the unit (e.g., the holder) has one or more reprogrammable pre-sets, each one capable of being semi-permanently set to select a carrier frequency on which the RF transmitter can operate, the activation of any one of the presets causing the RF transmitter to operate on the carrier frequency to which that preset has been programmed; and/or the semi-rigid elongate metallic antenna portion of the connector comprises a gooseneck; and/or the connector is mechanically coupled to the holder through a swivel joint; and/or the gooseneck is directly connected to the swivel joint; and/or the connector is directly mechanically connected to the power acquisition sub-unit; and/or the power acquisition sub-unit comprises a cigarette lighter adapter; and/or the cigarette lighter adapter comprises a housing having a distal end, a proximal end, and a length running from the distal end to the proximal end, the distal end being adapted for insertion into and positioning within a cigarette lighter (e.g., the cigarette lighter of a vehicle), the cigarette lighter having a depth and an inner circumference; and/or the cigarette lighter adapter further comprises a deformable resilient member having an outer circumference, the deformable resilient member being mounted (semi-permanently or otherwise) on the cigarette lighter adapter near the distal end so that its outer circumference is generally perpendicular to the length of the housing; and/or the outer circumference of the deformable resilient member is larger than the inner circumference of the cigarette lighter so that pushing the distal end of the cigarette lighter adapter into the cigarette lighter causes the outer circumference of the deformable resilient member to bend away from the distal end of the cigarette lighter adapter and towards the proximal end of the cigarette lighter adapter while at least some of the deformable resilient member even after such deformation continues to push against the inner circumference of the cigarette lighter, thereby stabilizing the cigarette lighter adapter in the cigarette lighter; and/or the cigarette lighter adapter carries a retainer between the deformable resilient member and the distal end of the cigarette lighter adapter to fix the deformable resilient member in position on the cigarette lighter adapter along the length of the cigarette lighter adapter; and/or the length of the cigarette lighter adapter is greater than the depth of the cigarette lighter so that the proximal end of the cigarette lighter adapter is not within the cigarette lighter when the distal end of the cigarette lighter adapter is fully positioned within (i.e., pushed all the way into) the cigarette lighter; and/or the connector is coupled to cigarette lighter adapter near the proximal end of the cigarette lighter adapter; and/or the power acquisition sub-unit has an audio output connector, which preferably makes available an output signal that is the same as or is derived from the data output signal from the electronic device; and/or the RF transmission system is capable of being (but is not necessarily) mechanically coupled to a structure in an environment (e.g., a cabinet, a vehicle, a building), the environment having an RF receiving system (e.g., an audio system), the RF transmission system desirably being designed to transmit an RF signal to the RF receiving system; and/or the RF transmission system is designed to be mechanically and electrically coupled to a vehicle, the vehicle having an audio system and an electrical system, for supporting the RF transmission system and drawing power from the electrical system of the vehicle, the RF transmission system being capable of transmitting an RF signal to the audio system; and/or the RF transmission system is designed to transmit an RF signal to the audio system of a vehicle; and/or the holder further comprises a cavity for receiving and releasably holding an RF transmitter and which has a connector to electrically couple the RF transmitter to the electronic device.

As used herein, "vehicle" and the like should be broadly understood and refer to vehicles of all types and designs, including watercraft, aircraft (both lighter-than-air and heavier-than-air), automobiles, trucks, carriages, golf carts, motorcycles, etc.

The terms "couple," "coupled," "couples," "coupling," and the like should be broadly understood and refer to connecting two or more elements or signals, electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled; etc, Coupling (whether only mechanical, only electrical, or both) may be for any length of time, e.g., permanent or semi-permanent or only for an instant.

"Electrical coupling" and the like should be broadly understood and include coupling involving any electrical signal, whether a power signal, a data signal, or mixture of the two.

"Mechanical coupling" and the like should be broadly understood and include mechanical coupling of all types.

"Semi-permanently" and the like should be broadly understood and refer to a position, coupling, etc. being able to be held until it is changed. For example, the connector may comprise a semi-rigid elongate metallic antenna portion that allows the position of the holder to be semi-permanently adjusted relative to the position of the power acquisition sub-unit. Thus, while keeping the power acquisition sub-unit in position, the semi-rigid elongate metallic antenna portion can be put into one position, which it holds until it is put into another position, which it then holds until changed from that second position, thereby twice semi-permanently adjusting the position of the holder relative to the position of the power acquisition sub-unit. Significant advantages of using a gooseneck as the connector include its being readily repositionable from one semi-permanent position to another, which helps make units of this invention usable in virtually any vehicle, even though vehicles differ widely in what obstructions (knobs, levers, etc.) are located near their cigarette lighters, because the gooseneck and holder can be adjusted so easily to avoid those obstructions.

As another example, the deformable resilient member (e.g., stabilizer 154 in, e.g., FIG. 9) may be, but need not be, semi-permanently mounted on the cigarette lighter adapter (e.g., power acquisition sub-unit 102 of FIG. 9 comprises a cigarette lighter adapter), e.g., the deformable resilient member may instead be permanently mounted. Thus, the deformable resilient member is preferably fixed in position on the cigarette lighter adapter but may be removed (e.g., by first unscrewing and removing nut 146 and retaining washer 158), e.g., to replace the deformable resilient member.

As another example, each one of the pre-sets of the RF transmission system may desirably be semi-permanently set to select a carrier frequency on which the RF transmitter can operate. Thus, e.g., a pre-set can be set to a carrier frequency and it will hold (i.e., correspond to) that frequency until that pre-set is reprogrammed to a different frequency. The term "pre-set" should be broadly understood to include any type of mechanism (whether or not having moving parts) that allows information, such as a frequency, to be set and held in the mechanism for later use. The one or more pre-sets used in the present invention desirably are programmable by the user but need not be (e.g., they may be permanently set by the manufacturer and not be reprogrammable by the user).

"Semi-rigid" and the like should be broadly understood and refer to a member being sufficiently flexible, pliable, etc. so that it holds a position and shape when not stressed but can be bent, twisted, etc., preferably without damaging the member. Thus, a semi-rigid member is preferably not so rigid that attempts to bend, twist, etc. it cause it to break, crack, etc. rather than bend, twist, etc. However, a wire itself would not be a semi-rigid elongate portion that allows the position of the holder to be semi-permanently adjusted relative to the position of the power acquisition sub-unit because, among other reasons, a wire by itself is not rigid or strong enough to support and semi-permanently maintain in the desired position either the empty holder or the holder when holding the electronic device.

The term "external power source" and the like should be broadly understood and refer to a source of electrical power outside of the item in question. For example, an external power source with respect to (i.e., outside of) the embodiments of this invention include a battery pack that is not part of the embodiment, a power plug or jack of a vehicle (e.g., the cigarette lighter of a car), or even the electrical system of the electronic device with which the embodiment of this invention is being used.

The term "circumference" and the like should be broadly understood and refer to some or all of the periphery of a member, regardless of the shape of the member (e.g., whether or not the shape of that member is all or partially concave, convex, straight, or a mixture of all three, and whether all or partially circular, elliptical, or otherwise curved, polygonal (e.g., triangular, square, pentagonal) or otherwise angular, etc.). Accordingly, the expression "the outer circumference of the deformable resilient member being larger than the inner circumference of the cigarette lighter" should be broadly understood to mean that at least some (but not necessarily all) of the periphery of the deformable resilient member extends radially beyond at least some of the periphery of the cigarette lighter. The outer circumference of the deformable resilient member need not have the same shape as the inner circumference of a cigarette lighter of a car (or other power source). Preferably, however, the deformable resilient member and the power source both have circular peripheries and all of the outer circumference (edge) of the deformable resilient member extends beyond the inner circumference of the power source.

This invention can provide a combined holder, electrical supply, and optional RF transmitter unit for an electronic device to be used, e.g., in a vehicle, having one or more of the following features and advantages: the unit may be mechanically mounted (desirably semi-permanently but otherwise, e.g., permanently, is also possible), e.g., to the vehicle, at only one point (e.g., by the cigarette lighter adapter); the unit is readily (i.e., rapidly and easily) connected, e.g., to the vehicle (the mechanical and electrical connection is made merely by plugging the power acquisition sub-unit (comprising a cigarette lighter adapter) into the vehicle's cigarette lighter; the unit remains connected to the vehicle even on bumpy roads and going around turns and resists rotation and other movement with respect to the vehicle, thereby keeping the electronic device in the desired position in the vehicle (in other words, the unit is stable); the unit is light-weight; the unit allows the position of the electronic device in the vehicle to be easily and semi-permanently adjusted (e.g., by means of a preferred gooseneck between the holder and the cigarette lighter adapter and/or by means of a preferred swivel joint between the gooseneck and the holder); the unit accommodates electronic devices of different sizes and holds them securely, even on bumpy roads and going around turns; the unit can provide power from the vehicle's electrical system to the electronic device; the cigarette lighter adapter of the unit accommodates cigarette lighters of different sizes and shapes; the unit converts the data output signal received from the electronic device (as is or as it may be modified) to an RF signal, which is then transmitted to the vehicle's audio system by using the gooseneck, when made of metal, as the broadcast antenna, the gooseneck thus functioning as an adjustable, repositionable mechanical support and connecting element and as an electronic signal transmission element, thereby providing a better signal to the vehicle's audio system; the unit produces a stronger and cleaner (e.g., more accurate) signal, e.g., to provide or facilitate a higher signal-to-noise ratio in the audio output; the unit allows the carrier frequency of the RF transmitter to be changed easily and rapidly and has a number of pre-sets for storing different carrier frequency information so that the unit can easily and rapidly be switched from one available pre-determined carrier (broadcast) frequency to another (e.g., by depressing the button that has been pre-programmed by the user to the desired one of the user predetermined carrier frequencies); a one-piece resilient protective membrane covers all of the buttons, thereby keeping dirt from entering the mechanism; the RF transmitter can be releasably held in the holder; both the electronic device and RF transmitter can be removed from the holder and coupled directly to each other and removed (if desired) from the vicinity of the rest of the unit (thereby allowing the transmitter to broadcast the RF signal (e.g., FM signal) to another RF receiver (e.g., in the user's home or office or in another vehicle equipped with a holder and power acquisition sub-unit unit of this invention; and the unit is sleek and modern looking.

Some electronic devices have their own internal batteries and internal charging circuits (e.g., Apple Computer's iPod mini MP3 player). A unit of the present invention can provide power to such electronic devices and allow them to charge even though the unit of this invention preferably does not itself have any charging circuitry.

The invention can also provide a power acquisition unit for supplying power to an electronic device, and/or a power supply and support apparatus for an electronic device, and/or a holder for an electronic device, and/or an RF transmission system for use in a vehicle, each having one or more features and advantages described above.

A combined holder, electrical supply, and optional RF transmitter unit of this invention can be mounted in the cigarette lighter (or other power connection) of virtually any vehicle (this adaptability is made possible by various features, including the stabilizer on the power acquisition sub-unit), and the holder can be positioned with respect to the power acquisition sub-unit so that the holder, the electronic device, and the connector do not interfere with the knobs, levers, etc. in the vehicle (this adaptability is made possible by various features, including the adjustability of the connector, e.g., the gooseneck, which desirably also functions as the RF antenna). In short, the present invention can provide a "one-size-can-fit-virtually-all" combined holder, power supply, and optional RF transmitter unit for electronic devices.

Other features and advantages are described below and still others will be apparent to those skilled in the art.

BRIEF DESCRIPTION OF THE DRAWINGS

To facilitate further description of the invention, the following drawings are provided in which:

FIG. 23 is a front elevational view of a third embodiment of this invention, with an iPod mini MP3 player attached.

These drawings are for illustrative purposes only and should not be used to unduly limit the scope of the invention.

DETAILED DESCRIPTION OF THE INVENTION

The shapes, dimensions, materials of construction, arrangements of the parts, etc. of the various embodiments of this invention are not critical except as otherwise noted, and any shapes, dimensions, materials of construction, arrangements of the parts, etc. may be used provided they allow those embodiments to operate and one or more of the benefits of this invention to be achieved.

Figure 1:
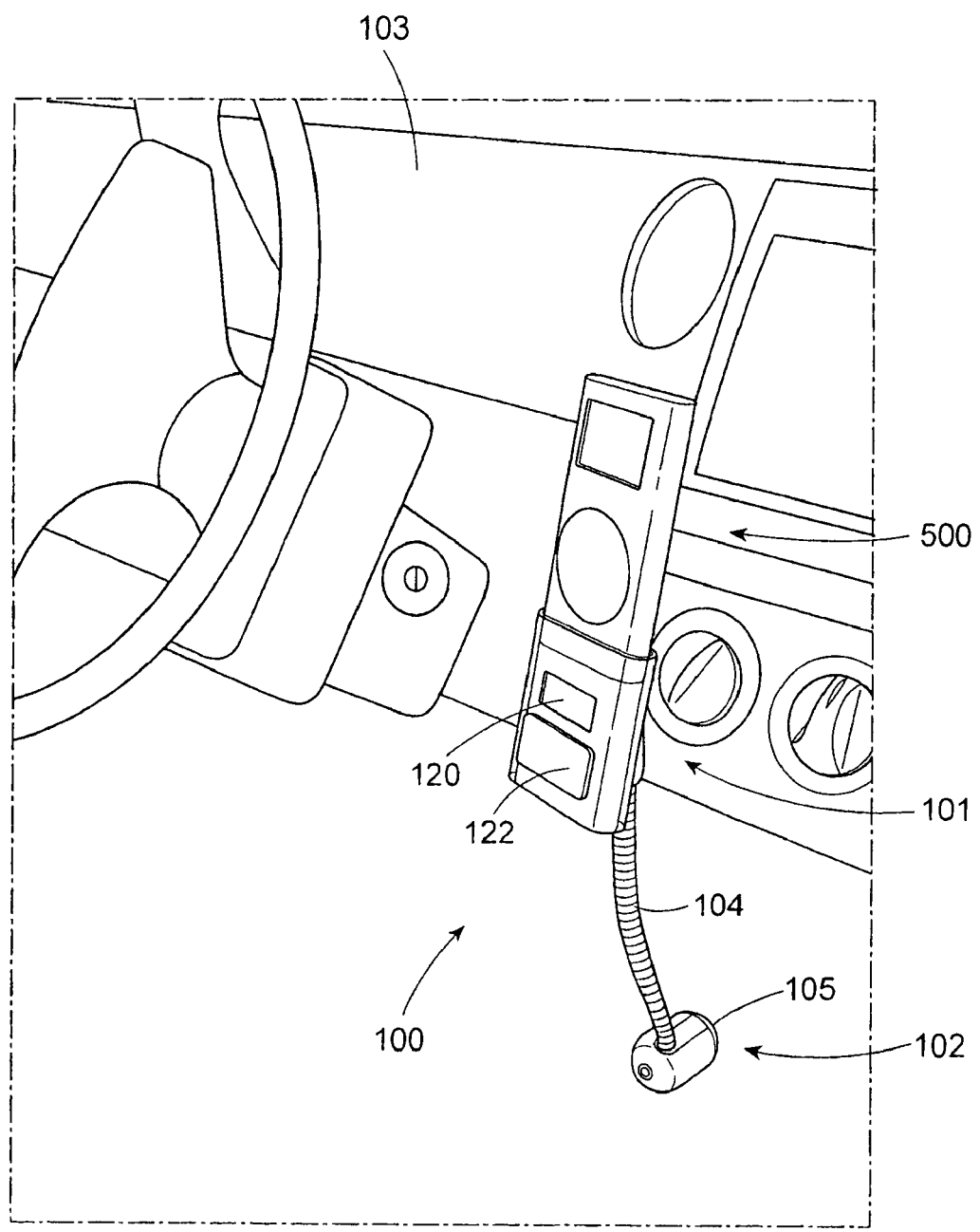
FIG. 1 shows a preferred embodiment of the present invention situated in an automobile, with an electronic device, more specifically an MP3 player (iPod mini MP3 player), attached, which embodiment contains an FM transmitter (an RF transmitter) for converting the data (audio) signal from the MP3 player and broadcasting it via an antenna (in this case, a metallic gooseneck that is part of the unit of this invention) to the automobile's FM receiver.
Figure 2:
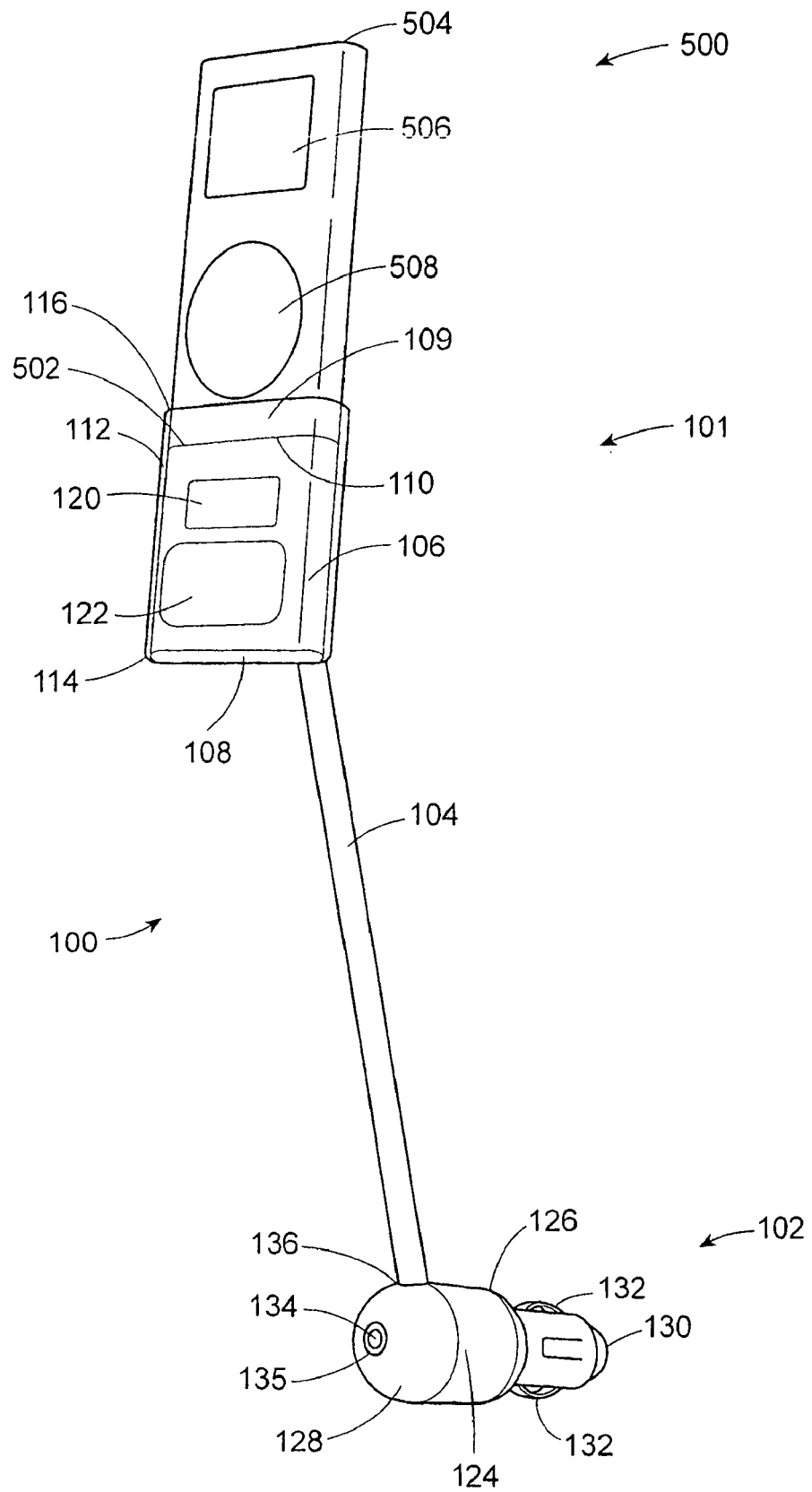
FIG. 2 is a front perspective representational view of the unit of FIG. 1, with an iPod mini MP3 player attached.
Figure 3:
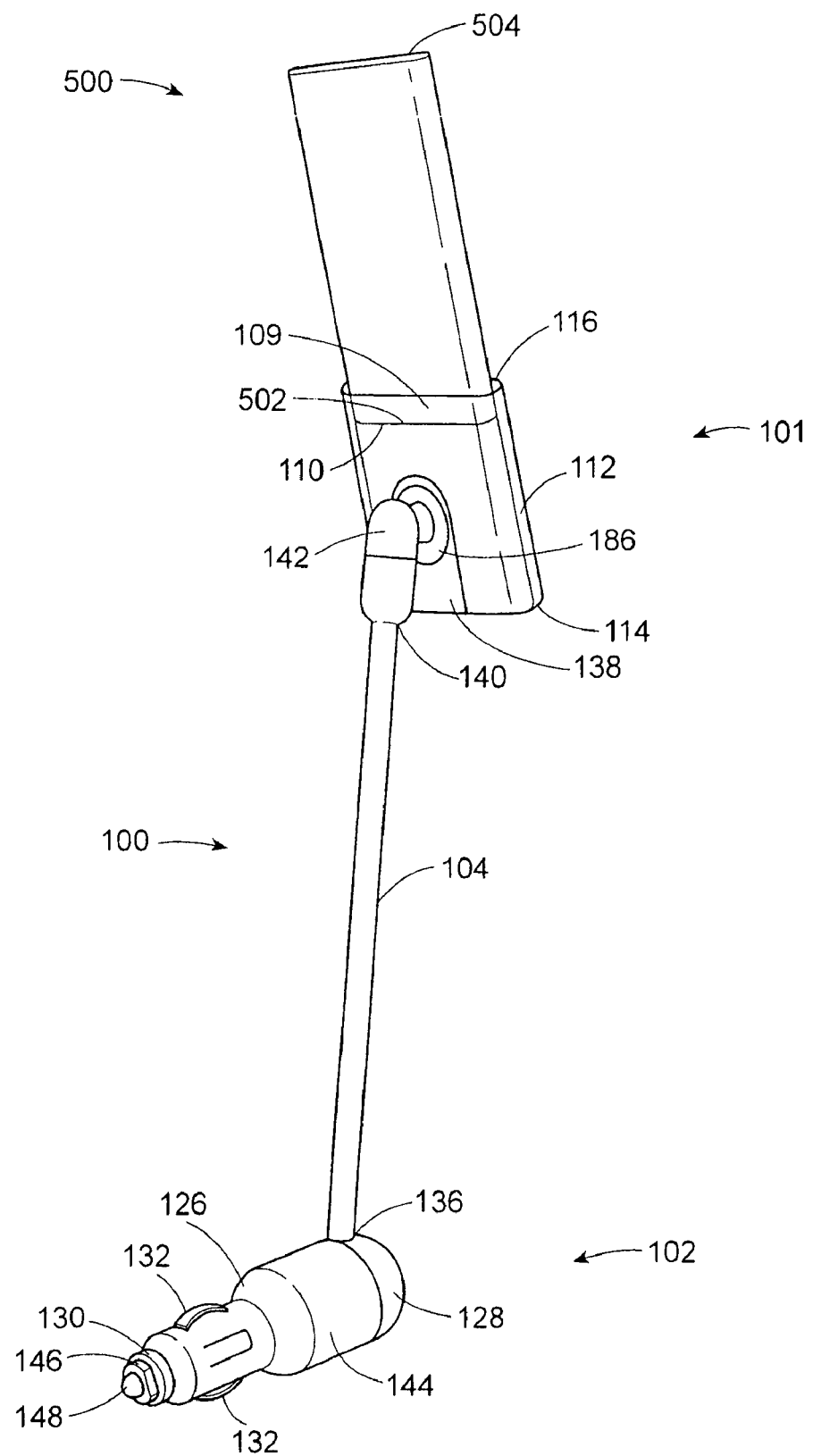
FIG. 3 is a back perspective view of the unit, with an iPod mini MP3 player attached.

FIG. 1 shows one preferred embodiment of this invention located in a preferred environment (a vehicle, namely, a car). Thus, FIG. 1 shows cigarette lighter adapter-gooseneck-transmitter 100 (i.e., a holder, electrical supply, and RF transmitter unit) holding (supporting) iPod mini MP3 player 500 (i.e., an electronic device) just in front of automobile console 103. Cigarette lighter adapter-gooseneck-transmitter 100 comprises holder (support assembly) 101, gooseneck 104 (connector), and power acquisition sub-unit 102 (comprising a cigarette lighter adapter), which is plugged into cigarette lighter 105 (i.e., an external power source).

The term "cigarette lighter" is to be broadly understood and includes any power source, whether or not in a vehicle and whether or not customarily used or designed for lighting cigarettes. Similarly, the term "cigarette lighter adapter" is to be broadly understood and includes any member, device, etc. at least a part of which mechanically mates with or fits into a "cigarette lighter" (as that term is to be broadly understood) and can draw power from it.

Although the power acquisition sub-unit is preferably removably coupled to the power source (e.g., cigarette lighter), the power acquisition sub-unit may in some cases be permanently affixed to the power source. For example, a driver of a vehicle who does not smoke may obtain a unit of this invention and hard-wire it into the cigarette lighter of the vehicle.

The term "removably coupled" and the like should be broadly understood and refer to one item (e.g., the power acquisition sub-unit, which may comprise a cigarette lighter adapter) being readily coupled to (e.g., by pushing) and readily uncoupled from (e.g., by pulling) another item (e.g., a power source, such as a vehicle's cigarette lighter). The absence of the word "removably," "removable," and the like near the word "coupled," "connected," and the like does not mean that the coupling, connection, etc. in question is or is not removable. For example, the recitation of a cigarette lighter adapter being coupled to a power source does not mean that the cigarette lighter adapter cannot be removed (readily or otherwise) from, or that it is permanently connected to, the power source.

Broadly speaking, and as explained below, power from the cigarette lighter flows through the cigarette lighter adapter, through one or more conductors (not shown) inside gooseneck 104, and to holder 101. Some of the power entering the holder flows to the FM transmitter (discussed below), which is inside the holder, and some of the power flows to the iPod mini MP3 player, which is held by holder 101. A data signal flows from the iPod mini MP3 player to the FM transmitter, which processes the data to produce an FM signal (an RF signal). The gooseneck is made of metal, and the FM signal is sent to (electrically coupled to) the gooseneck, which functions as an antenna in addition to its functioning as a repositionable mechanical connection and support between holder 101 and power acquisition sub-unit 102.

Gooseneck 104 has been positioned (e.g., by bending) and holder 101 has been turned with respect to power acquisition sub-unit 104 so that the front of iPod mini MP3 player 500 is readily viewable by the driver of the vehicle. That permits the driver to read the information provided by liquid crystal display 120, such as the carrier (broadcast) frequency to which the FM transmitter is tuned, and also to read the information on button-covering membrane 122, which covers six pushbuttons. The membrane provides a neat appearance and keeps dirt from entering the pushbutton and other mechanisms inside the inner cavity of holder 101.

Although pushbuttons are used in this embodiment, any type of button can be used and the term "button" should be broadly understood to refer to any type of mechanism (with or without moving parts) whereby the user can input to the unit of this invention his or her data (for example, selection of a frequency), e.g., a mechanical pushbutton, an electrostatic pushbutton, an electrostatic array, or any other input device of any type.

Two of the six pushbuttons under the membrane are up-down frequency selection buttons, which allow the carrier frequency (on which the FM signal will be broadcast) to be adjusted up or down within the unit's range (e.g., 88.1 to 107.9 MHz), and four of which control pre-sets. Thus, a carrier frequency within the range may be selected by the vehicle's driver using the up-down buttons and then, if desired, one of the pre-sets can be semi-permanently set (programmed) to that carrier frequency (e.g., by depressing the desired one of the four dedicated pre-set buttons for a sufficient length of time, e.g., a few seconds). The FM transmitter will operate at the selected frequency whether or not a pre-set is programmed to correspond to that frequency. The pre-sets may be re-set at any time to any desired frequency within the allowed range. The FM (RF) receiver of the car's audio system is set in the usual way to the same frequency on which the transmitter is operating so that it receives the signal being broadcast by the unit of this invention.

The RF (radio frequency) spectrum is often considered to run from about 10 kHz (kilohertz) or below to about 100 GHz (gigahertz) or above, and the RF transmitter of this invention can utilize any appropriate frequency and/or any type of RF transmitter, including an AM (amplitude modulation) transmitter, an FM (frequency modulation) transmitter, a Bluetooth transmitter, or any other type of suitable RF transmitter. For a civilian vehicle (e.g., family car), either FM or AM frequencies and transmitters desirably will be used, with FM being preferred because of its superior sound quality as compared to AM.

The unit of this invention holds iPod mini MP3 player 500 tightly in position even though the iPod mini is held only at its bottom portion. The unit is easily adjustable (both electronically and mechanically), provides power and FM (RF) transmission capability, provides a strong FM (RF) signal (thereby improving the quality of the audio output), is sleek and aesthetically appealing, and allows easy repositioning of the holder with respect to the cigarette lighter adapter to accommodate a wide range of vehicles (which vary widely as to where their cigarette lighters are located and what other potentially spatially interfering members, e.g., gear shift levers, are nearby).

With reference now to FIGS. 2 through 8, 13, and 14, cigarette lighter adapter-gooseneck-transmitter unit 100 is again seen to comprise holder 101 (in which iPod mini MP3 player 500 is firmly held at its bottom portion), power acquisition sub-unit 102, and gooseneck (connector) 104. iPod mini MP3 player 500, which is not part of this invention, has bottom 502, top 504, liquid crystal display 506, and control wheel 508. Holder 101 comprises outer enclosure 112, which has bottom 114 and top 116, and inner enclosure ("clam shell"), which comprises front inner enclosure member 106 and back inner enclosure member 138. Outer enclosure 112 is a one-piece (unitary) member, which slips over front inner enclosure member 106 and back inner enclosure member 138 and holds them in close-fitting abutment. Front inner enclosure member 106 and back inner enclosure member 138 are not mirror images of one another. Thus, each of racetrack-shaped bottom 108 and top 110 is part of front inner enclosure member 106. Inner enclosure alignment and retention tabs 198 (along the top and bottom edges of back inner enclosure member 138), tabs 206 (along the back edge of top 110 of front inner enclosure member 106), and alignment slots 196 help maintain members 106 and 138 in proper registry with one another.

Figure 12:
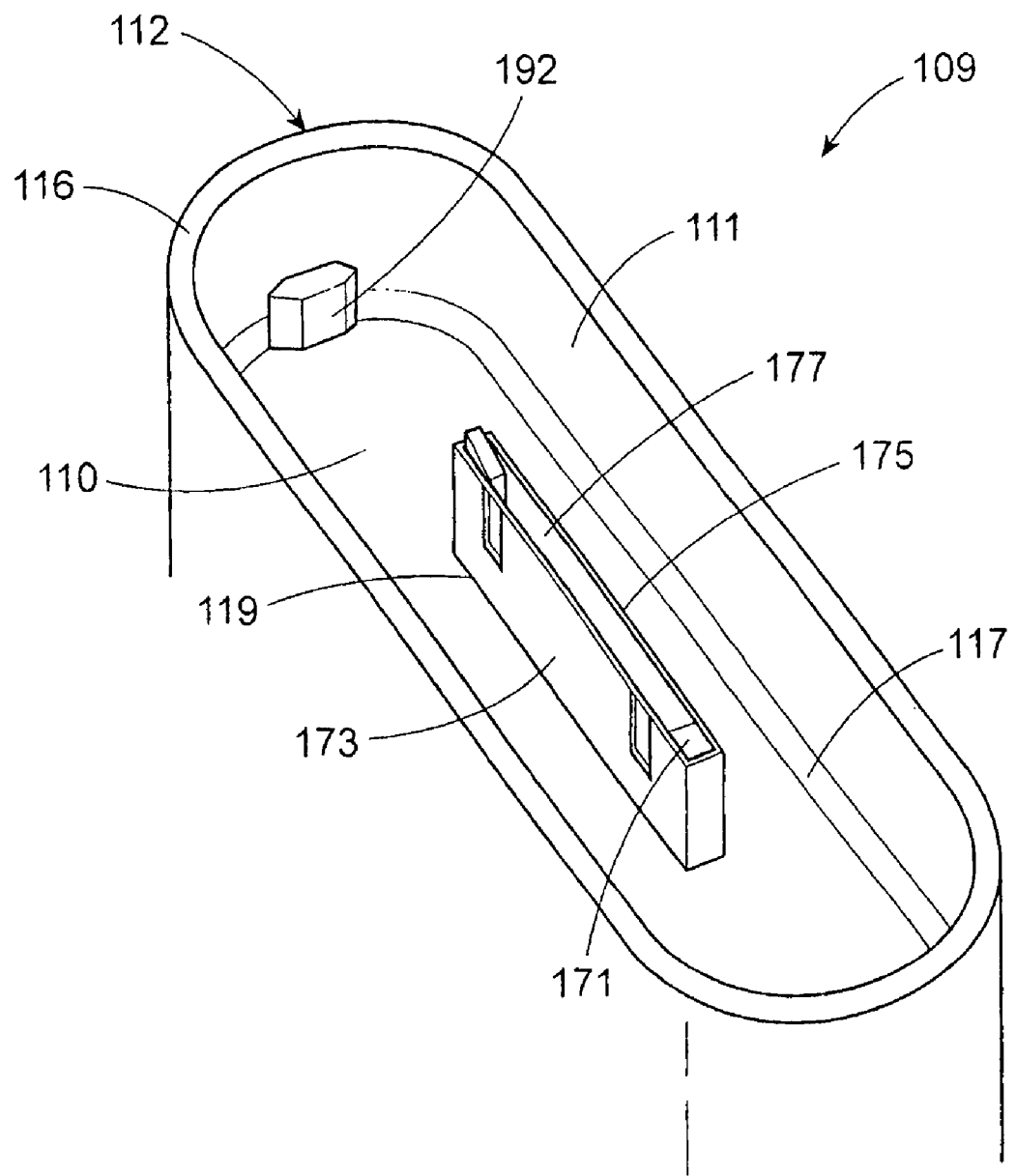
FIG. 12 is an enlarged partial view of the top, bottom wall, and sidewall of the unit's holder (support assembly), which receives the iPod mini MP3 player when the invention is in use (i.e., when the electronic device is in the holder)
Figure 13:
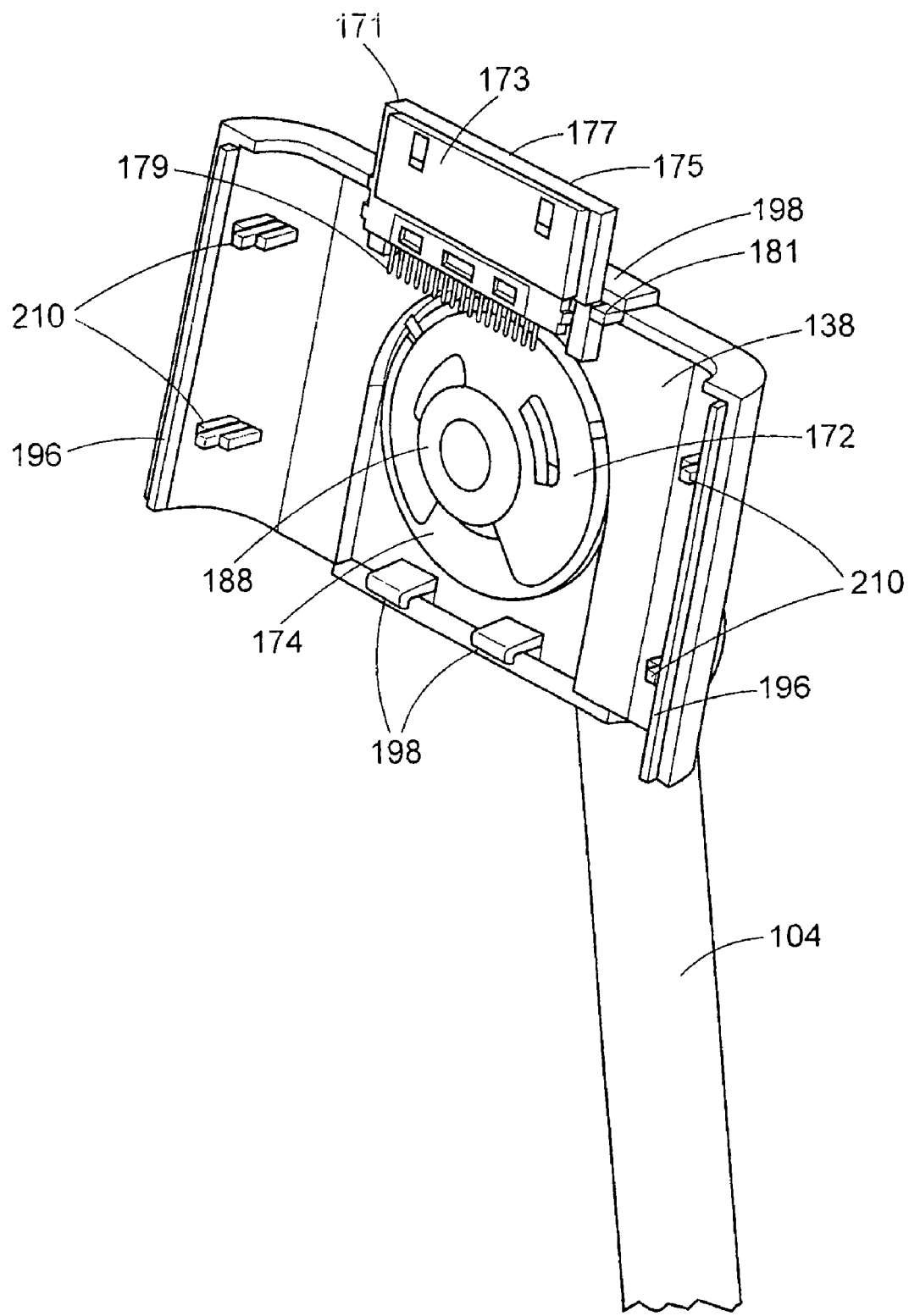
FIG. 13 is a perspective view of the back inner enclosure member of the support assembly (holder)
Figure 14:
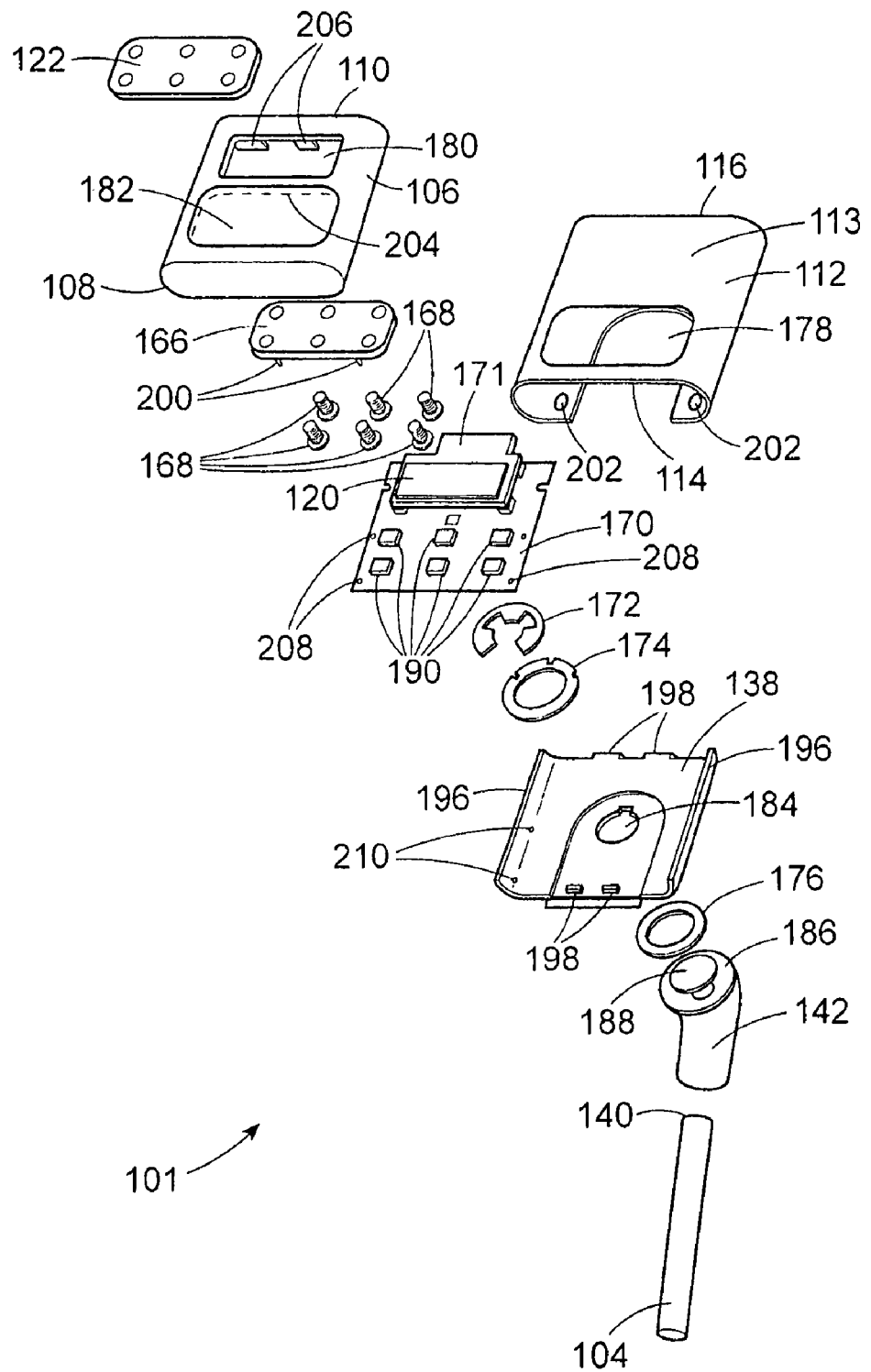
FIG. 14 is an exploded view of the support assembly (holder)
Figure 22:
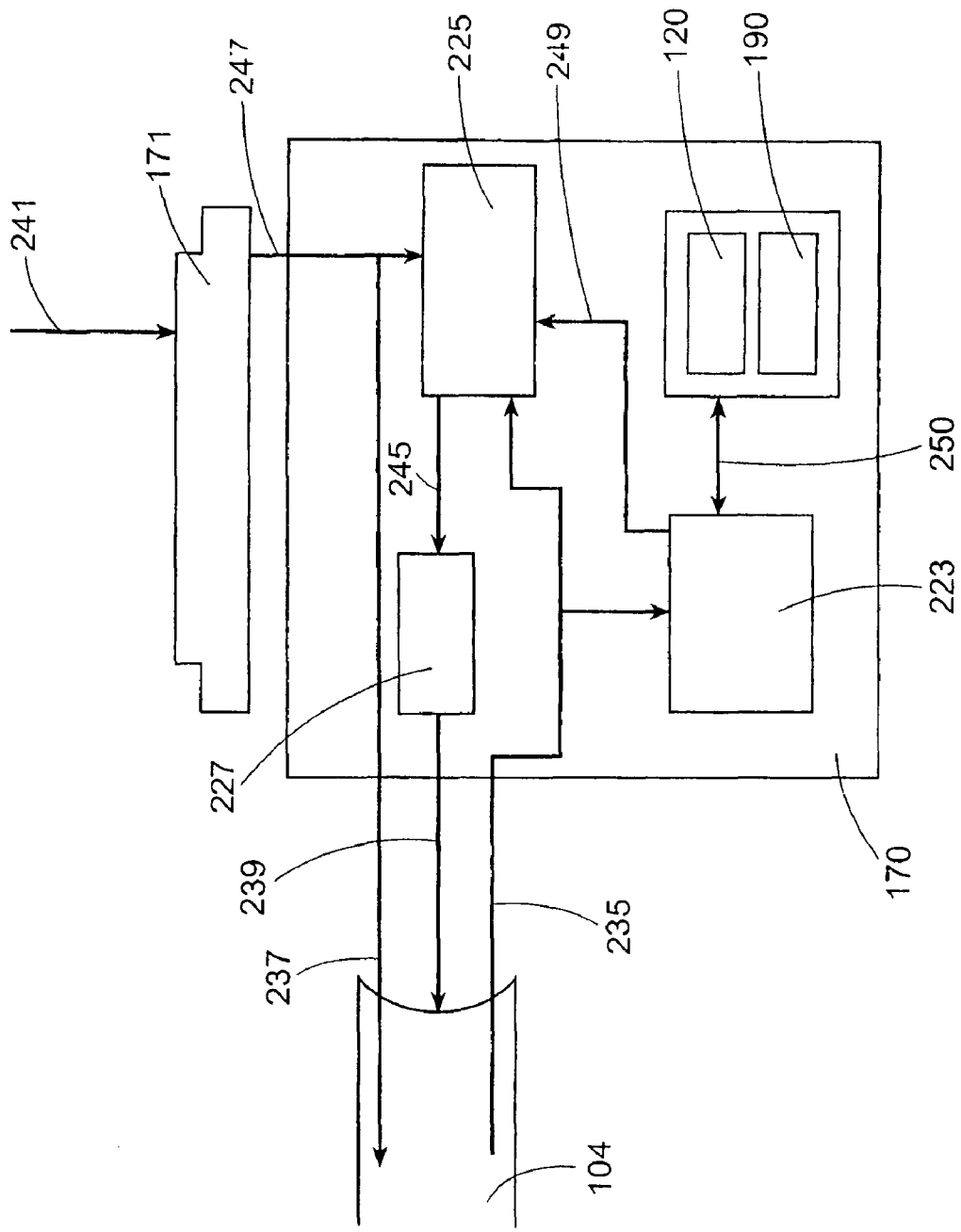
FIG. 22 is a block diagram of the holder (support assembly) and gooseneck antenna of the embodiment of FIG. 1.

As best appreciated from FIGS. 13 and 14, the two inner enclosure members 106 and 138 together define at least one inner cavity between them in which printed circuit board (PCB) 170 is held. Alignment pins 210 on the inside surface of back inner enclosure member 138 fit into printed circuit board slots 208 to fix the printed circuit board in position in the inner cavity. With reference briefly also to FIG. 22, printed circuit board 170 carries liquid crystal display 120, six momentary pushbutton switches 190, microprocessor 223, stereo modulator and FM transmitter circuitry 225, attenuation circuit 227, and 30-pin dock connector 171 (see also FIG. 12). As will be understood by one skilled in the art, microprocessor 223, stereo modulator and FM transmitter circuitry 225, and attenuation circuit 227 (the functioning of each of which is further described below) may be placed in any convenient location on printed circuit board 170.

Returning to FIG. 14, six pushbuttons 168 (the six pushbuttons described above for selecting the broadcast frequency) are held in proper registry above the six momentary pushbutton switches 190 by button frame 166. Button frame 166 is held in position with respect to the six momentary pushbutton switches by being held in opening 182 of front inner enclosure member 106. Member 106 is itself held in position with respect to back inner enclosure member 138, which carries printed circuit board 170 with momentary pushbutton switches 190, in the manner previously described. Button frame alignment pins 200 on the back face of button frame 166 snap into and are fixedly held in the spaces between button frame alignment and retention tabs 204.

Figure 4:
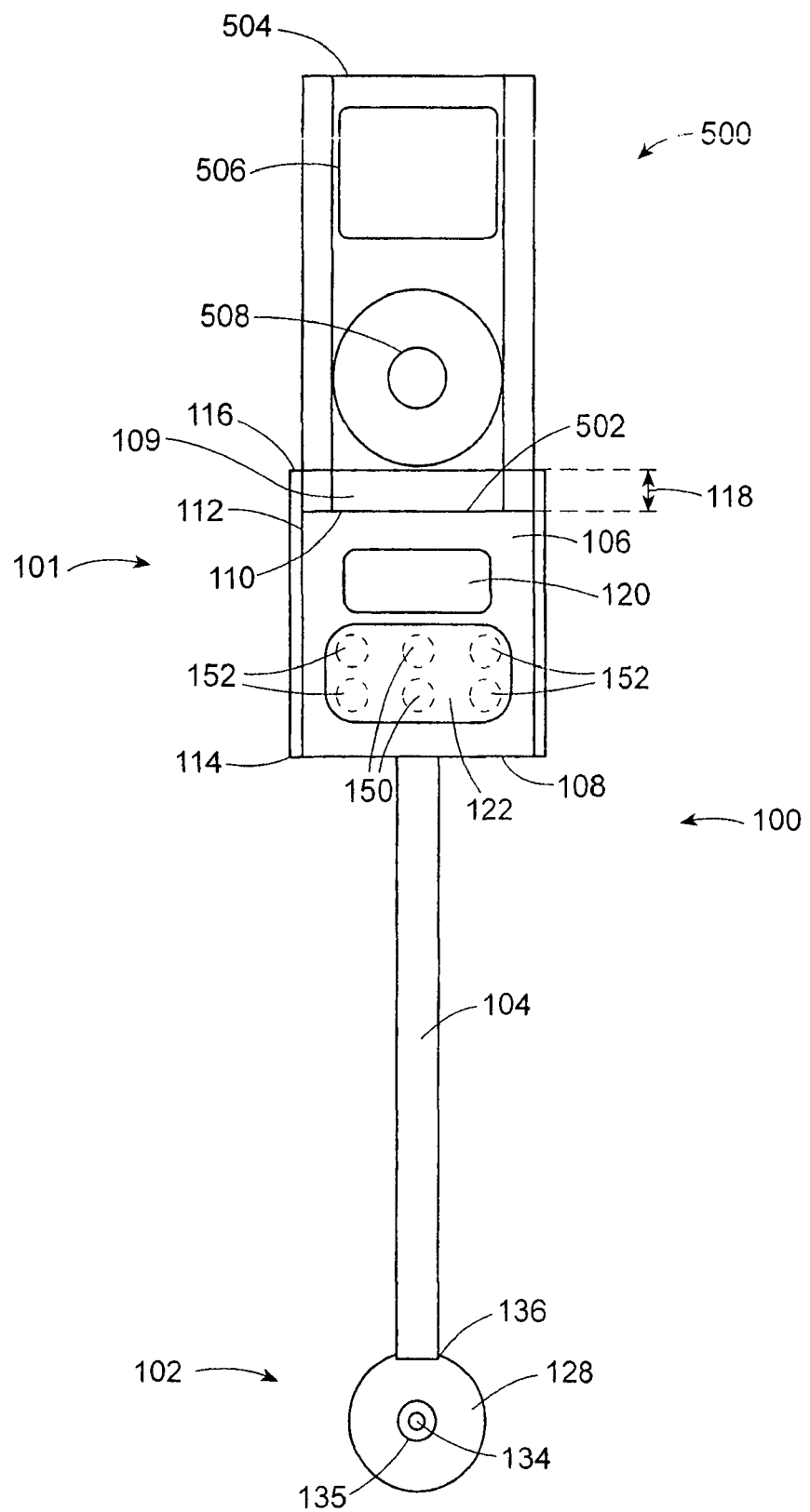
FIG. 4 is a front elevational view of the unit, with an iPod mini MP3 player attached.

Imperforate button-covering membrane 122, which is held in opening 182 in front inner enclosure member 106, overlies the six pushbuttons, thereby protecting them and their momentary pushbutton switches from dirt. Membrane 122 carries indicia 150 to indicate the function of the two up-down buttons and indicia 152 to indicate the function of the buttons that control the pre-sets (FIG. 4). Membrane 122 may be held in place by being affixed to button frame 166, e.g., by adhesive. The face of liquid crystal display 120 is visible through opening 180 in front inner enclosure member 106. Membrane 122 is flexible so that pushing the indicia for a button also pushes in the button beneath that indicia.

After printed circuit board 170 and its accompanying elements have been put in place in and on front and back inner closure members 106 and 138 and the two members 106 and 138 have been aligned and brought together, outer enclosure 112 is slid down over the inner enclosure assemblage until outer enclosure alignment and locking slots 202 (at the bottom of the back of outer enclosure 112) interlock with two mating raised portions (not shown) on the bottom of the outer surface of back inner closure member 138, thereby locking the two inner members together and locking itself to the two inner members. In this locked assemblage of the three enclosure members (outer enclosure 112 and inner enclosure members 106 and 138), face 113 overlies liquid crystal display 120 and opening 178 coincides with button-covering membrane 122 (in opening 182), thereby protecting the face of liquid crystal display 120 and allowing the control pushbuttons to be pressed by the user to adjust the broadcast frequency.

As best seen in FIG. 4, in this embodiment, only the bottom portion of iPod mini MP3 player 500 is held in cavity 109. By "bottom portion" of an electronic device that can be held by an embodiment of this invention is meant the portion of the device running from (and including) the bottom of the electronic device toward the top of the electronic device and typically ending no higher than bottom of controls of the electronic device so that the ability to use the electronic device is not impaired. Typically, "bottom portion" means the lower 40% or less of the device, typically the lower 33% or less of the device, desirably the lower 25% or less of the device, and preferably the lower 20% or less of the device. For small electronic devices (e.g., Apple Computer's iPod mini MP3 player), the bottom portion will typically be the lower 30 millimeters or less of the device, desirably the lower 25 millimeters or less of the device (e.g., in the range of 5 to 25 millimeters), and preferably the lower 20 millimeters or less of the device (e.g., in the range of 6 to 20 millimeters). For the iPod mini MP3 player, the bottom portion is approximately the lower 9 millimeters.

Cavity 109 of holder 101 desirably has a height sufficient to tightly hold just the bottom portion of the electronic device. The bottom of cavity 109 is defined by top 110 of front inner enclosure member 106. Referring also to FIG. 12, sidewall 111 of cavity 109 is formed by that portion of outer enclosure 112 that extends above top 110, the sidewall extending from the bottom of cavity 109 to top 116 of outer enclosure 112 (the depth of cavity 109 being indicated by reference numeral 118). Thus, when iPod mini MP3 player 500 is pushed down into cavity 109 so that its bottom 502 contacts top 110, sidewall 111 of cavity 109 encircles and holds the bottom portion of iPod mini MP3 player 500.

Still referring to FIG. 12, outer enclosure 112 has ledge or rim 117, which runs around the inner surface of outer enclosure 112 near its top 116. Rim 117 fits into a dado (groove) that runs around the periphery of top 110 of front inner enclosure member 106 and that is essentially the same size (height and width) as rim 117. Rim 117 thus acts as a vertical stop member and helps keep the assemblage of the two inner enclosure members 106 and 138 from moving inside outer enclosure 112. Furthermore, in the locked assemblage of outer enclosure 112 and the two inner enclosure members 106 and 138, top 110 and rim 117 together constitute an even (constant height) bottom for cavity 109.

It will be understood by one skilled in the art that cavity 109 may be deeper (i.e., sidewall 111 may extend higher above the bottom of cavity 109) so as to provide more area to grip the electronic device that is placed into the cavity. For example, with reference to FIG. 2, top 116 could be higher up, e.g., up to or above control wheel 508, in which case a cut-out at the front of cavity 109 would desirably be provided so that control wheel 508 was sufficiently (preferably completely) accessible. It will also be understood by one skilled in the art that cavity 109 may completely contain the electronic device, that is, the cavity may be formed by members that run along the sides of the device and are connected by a top member to completely encircle the electronic device. Cavity 109 may have any size and shape desired, consistent with the size and shape of the electronic device and the environment in which the unit of this invention will be used to hold and supply power to the electronic device.

Although the cavity is desirably manufactured to provide as little distance as possible between the inner surface of the sidewall and the outer surface of the electronic device (so that the device will be firmly held in the cavity), as a practical matter, the cavity cannot be manufactured to provide a perfect fit under all conditions (e.g., with changes in ambient temperature) for several reasons, including variations in dimensions of both the cavity and the electronic device arising from manufacturing tolerances. Biasing members help avoid this problem.

Cavity 109 desirably is defined at least in part by biasing members (not shown) that help hold the electronic device in position. Any type of one or more biasing members may be used, e.g., deformable plastic and/or elastic materials (e.g., elastomers and plastomers), spring-biased members (for example, leaf springs, ball-in-socket detents), and the like. The biasing members may be located at any one or more convenient locations in the cavity, for example, along the sidewall. Biasing members help hold the device in position in the cavity by pushing against the device (even minimally), thereby forcing it towards another member that defines the cavity. Thus, placing a biasing member at the bottom of the cavity (which would push the electronic device upwards) would generally be counterproductive unless the cavity was defined at least in part by a top element against which the top of the device would be pushed by such a biasing member.

One preferred biasing member is a deformable crush bar, made, e.g., of plastic, on the inside of the sidewall (so that it faces the electronic device when it is in cavity 109) and arranged with its longitudinal axis lying vertically. Without crush bars or the like, dimensional variations arising from manufacturing tolerances (in the manufacture of the holder as well as of the electronic device) might result in there being too much distance between the cavity sidewall and the outer surface of the electronic device and, therefore, insufficient frictional engagement between the inner surface of the cavity and the outer surface of the electronic device.

In some possible embodiments of this invention for holding and supplying power to iPod mini MP3 player 500, two crush bars are used in cavity 109 of holder 101, arranged with the two crush bars symmetrically located on the rear straight portion of the inside of the sidewall, approximately 15 to 30 millimeters apart (the straight portion of each sidewall is approximately 40 millimeters long in a holder for iPod mini MP3 player 500) and with each crush bar measuring approximately 9 millimeters long (i.e., as long as the cavity is high), approximately 0.5 millimeters deep (the distance away from the sidewall towards the electronic device), and approximately 1 to 2 millimeters wide (the side-to-side distance). The crush bars are preferably sloped or chamfered so that they extend away from the rear inside wall their maximum depth (i.e., approximately 0.5 millimeters) at the bottom of the cavity and less than that (e.g., 0.1 millimeters or less) at the top of the cavity. In these embodiments, the two crush bars are desirably made integral with outer enclosure 112 by being molded as part of the outer enclosure (rather than being affixed to it after it has been made). Preferably, however, crush bars are not used.

With reference again to FIGS. 12 and 14, two alignment pins 192 (only one of which is shown) rise up from top 110 of front inner enclosure member 106, i.e., alignment pins are attached to and extend up away from the bottom of cavity 109. Alignment pins 192 fit into (i.e., mate with) corresponding concavities (not shown) in the bottom of iPod mini MP3 player 500. Dock connector 171, which is attached to printed circuit board 170 and has front wall 173, back wall 175, and receiving slot/receptacles 177 (for the pins of the multi-pin connector of the iPod mini MP3 player), passes through opening 119 in top 110 of front inner enclosure member 106. Dock connector 171 is mechanically coupled to back inner enclosure member 138 and aligned by means of alignment tabs 181 (FIG. 13) as well as being coupled to printed circuit board 170, which is coupled to back inner enclosure member 138 by alignment pins 210.

The dock connector mates with a corresponding concavity in the iPod mini MP3 player in which a multi-pin connector (i.e., a 30-pin connector, which is not shown) is located, and the slots/receptacles of the dock connector receive and mate with the pins of the pin connector. Electrical signals, as power and/or data, flow from and to the electronic device in cavity 109 through the multi-pin connector and dock connector when the electronic device is being held in the cavity. The receptacles in dock connector 171 are electrically coupled to pins 179 on its bottom side, which pins extend into the inner cavity (FIG. 13). At least some of those pins are directly or indirectly electrically coupled to printed circuit board 170 inside holder 101 for carrying electrical signals, as power and/or data, between the electronic device and the unit of this invention.

Because the multi-pin connector is recessed in the bottom of the iPod mini MP3 player 500 and the opening to that concavity is not much larger in cross-section than the portion of dock connector 171 that extends above top 110 and has the same cross-sectional shape (FIG. 12), dock connector 171 when in that concavity also helps hold iPod mini MP3 player 500 firmly in cavity 109 of holder 101. Thus, iPod mini MP3 player 500 is held in the holder by the mechanical and frictional engagement of the MP3 player's outer surface with the inner surface of cavity 109 (including the preferred crush bars), by the engagement of alignment pins 192 with mating concavities in the bottom of the MP3 player, by the engagement of dock connector 171 with the mating concavity for the multi-pin connector in the bottom of the MP3 player, and by the engagement of the pins of the multi-pin connector of the MP3 player with the mating receptacles of the dock connector.

As will be understood by one skilled in the art, any suitable number of alignment pins or other protuberances (or recesses that mate with protuberances of the electronic device) may be used to help hold the electronic device in the holder, and they may have any suitable size, shape, and location. There will usually be at least one protuberance in the cavity, namely, an electrical connector for the flow of power and/or data signals between the unit of this invention and the electronic device held by it. Other protuberances (e.g., alignment pins) may also be used, depending on the availability, location, size, and shape of recesses in the electronic device. Although protuberances that help hold the electronic device in the holder will typically be in the cavity of the holder at the bottom, one or more such protuberances may be on the electronic device and/or may be in the cavity of the holder at a location other than the bottom. Thus, if a holder is designed to completely encircle the electronic device when it is being held, the holder may have a partial or complete back wall and one or more of the protuberances (or recesses) may be located on the back wall.

In the preferred embodiment of FIG. 1 et seq., the holder has the following approximate dimensions. The outer enclosure is 6.3 centimeters high, 5.6 centimeters wide (the tangent-to-tangent distance from the outside surface of one curved end of the racetrack cross-sectional area of the holder to the outside surface of the other curved end), and 1.8 centimeters deep (the distance between the outer surfaces of the front and back of the holder). The outer enclosure is made of clear plastic approximately 1.5 millimeters thick. The assemblage of the front and back inner enclosures 106 and 138 is approximately 5.4 centimeters high, 5.3 centimeters wide (the tangent-to-tangent distance from the outside surface of one curved end of the racetrack cross-sectional area of the assemblage to the outside surface of the other curved end), and 1.5 centimeters deep (the distance between the outer surfaces of the front and back of the assemblage). The inner enclosure members are made of colored plastic approximately 1.5 centimeters thick, although various tabs, walls defining alignment holes, etc. may be of different thicknesses. Rim 117 (see FIG. 12) is located on the inner surface of outer enclosure 112, about 9 millimeters below its top edge 116. Rim 117 is approximately 1 millimeter wide and approximately 1 millimeter thick, and there is a corresponding mating grove running around the periphery of the assemblage of the two inner enclosure members. Alignment pins 192 are generally rectangular solids, approximately 4 millimeters long, 2 millimeters wide, and 3 millimeters high, rising from top 110 of front inner enclosure member 106 and spaced about 1 millimeter from its periphery. Opening 180 for liquid crystal display 120 is approximately 3.1 centimeters long and 1.4 centimeters high, and openings 178 and 182 for button-covering membrane 122 are each approximately 4.1 centimeters long and 2.1 centimeters high.

The holder may be made of any sufficiently hard formable material (desirably scratch-resistant and sufficiently rigid), although plastic, particularly engineering plastic, will usually be employed (except for those parts that must be made of another material, e.g., the conductive portions, such as the electrodes). One preferred material is polycarbonate, which is available from GE Plastics, Pittsfield, Mass., US, under the name Lexan.

As shown in FIGS. 2 through 8, unit 101 also comprises connector 104, which mechanically and electrically connects holder 101 to power acquisition sub-unit 102 (further described below). Connector 104 desirably comprises a gooseneck and in preferred embodiments is made of metal so that it can be used as a broadcast antenna by the RF transmitter.

With reference also to FIGS. 13 and 14, connector 104 is coupled to holder 101 through swivel connector 142, which comprises swivel connector flange 186 and hollow protrusion 188. Both flange 186 and protrusion 188 are circular, but flange 186 is of larger diameter than protrusion 188. Protrusion 188 has a peripheral circular groove next to its end face, with flange 186 lying against the rear outer surface of back inner enclosure member 138 when assembled. In the assembled unit, protrusion 188 passes through the central circular opening of friction washer 176 (which lies between flange 186 and the rear outer surface of back inner enclosure member 138), through circular opening 184 of member 138, and then through the central circular opening of washer 174 (which lies against the inner surface of back inner enclosure member 138). Retaining ring 172, which presses against, frictionally engages, and moves with washer 174, is snapped (friction fit) into the peripheral circular groove, thereby locking protrusion 188 inside the inner cavity formed when front and rear inner enclosure members 106 and 138 are joined together. Retaining ring 172 is free to revolve around protrusion 188 because the retaining ring is free to move along the circumference of the groove. Accordingly, back inner housing member 138, which presses tightly against washer 174, which in turn presses tightly against retaining ring 172, is free to rotate 360 degrees around protrusion 188.

Figure 5:
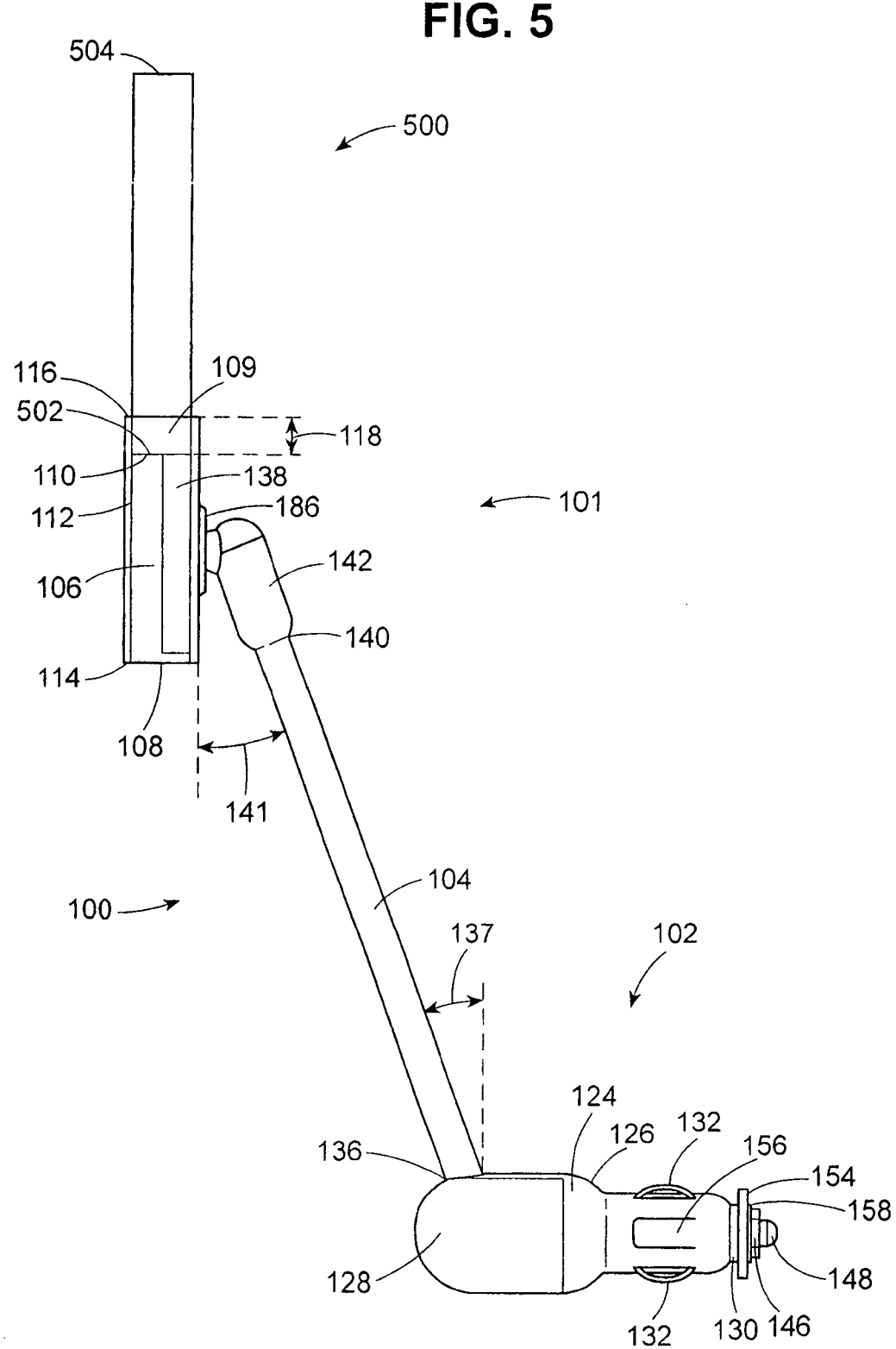
FIG. 5 is a right-side elevational view of the unit, with an iPod mini MP3 player attached.
Figure 6:
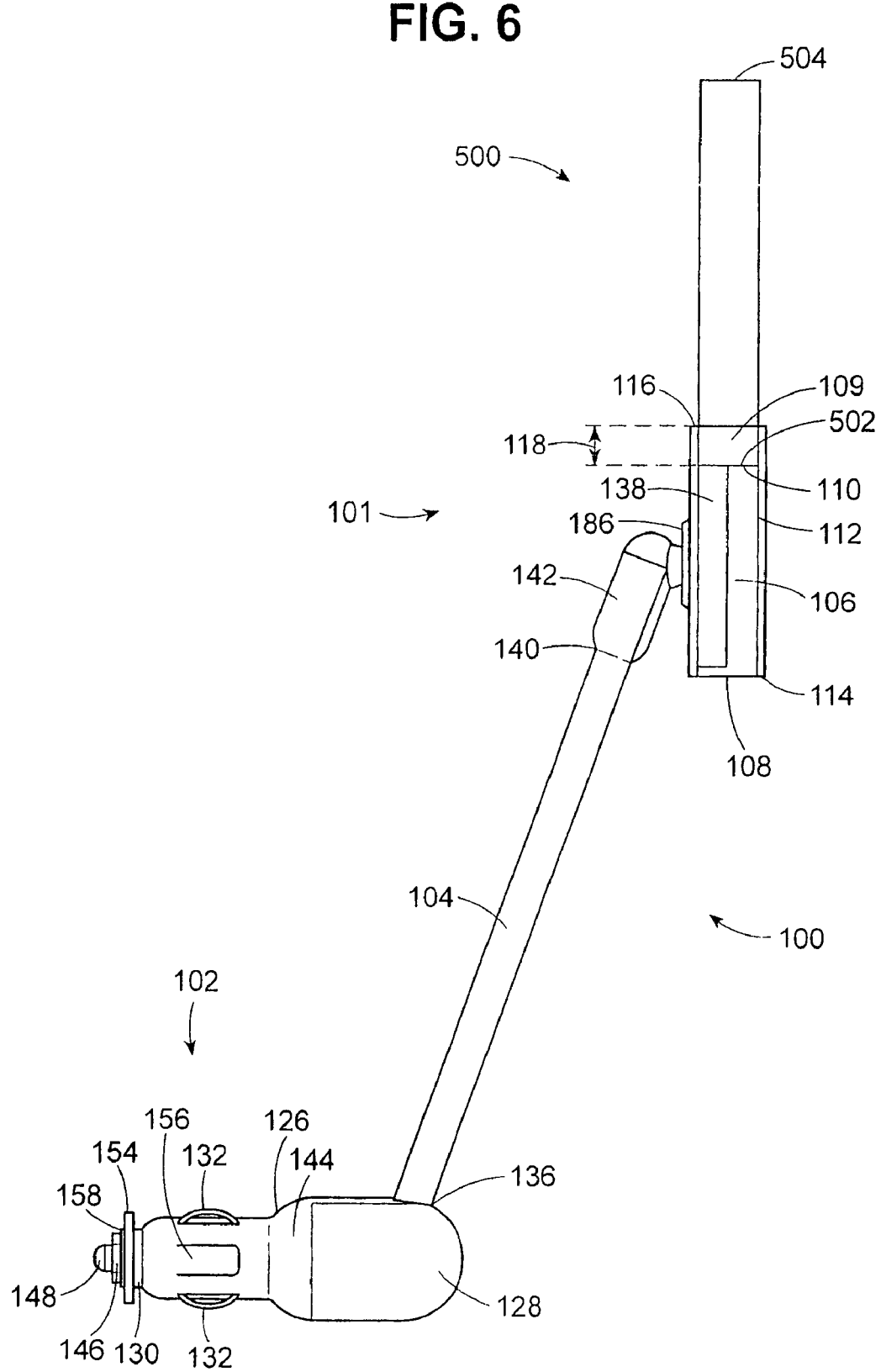
FIG. 6 is a left-side elevational view of the unit, with an iPod mini MP3 player attached.
Figure 7:
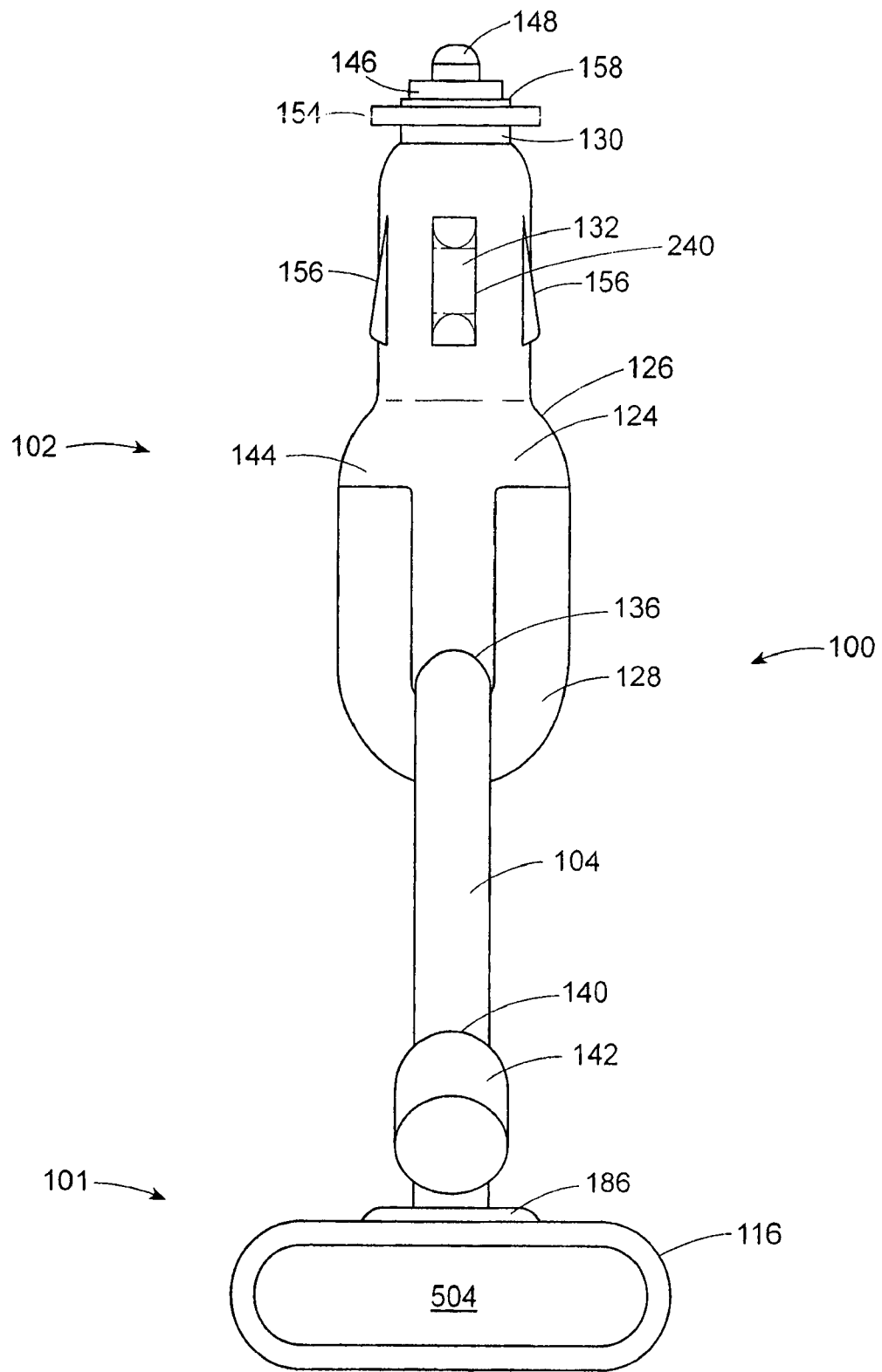
FIG. 7 is a top view of the unit, with an iPod mini MP3 player attached.
Figure 8:
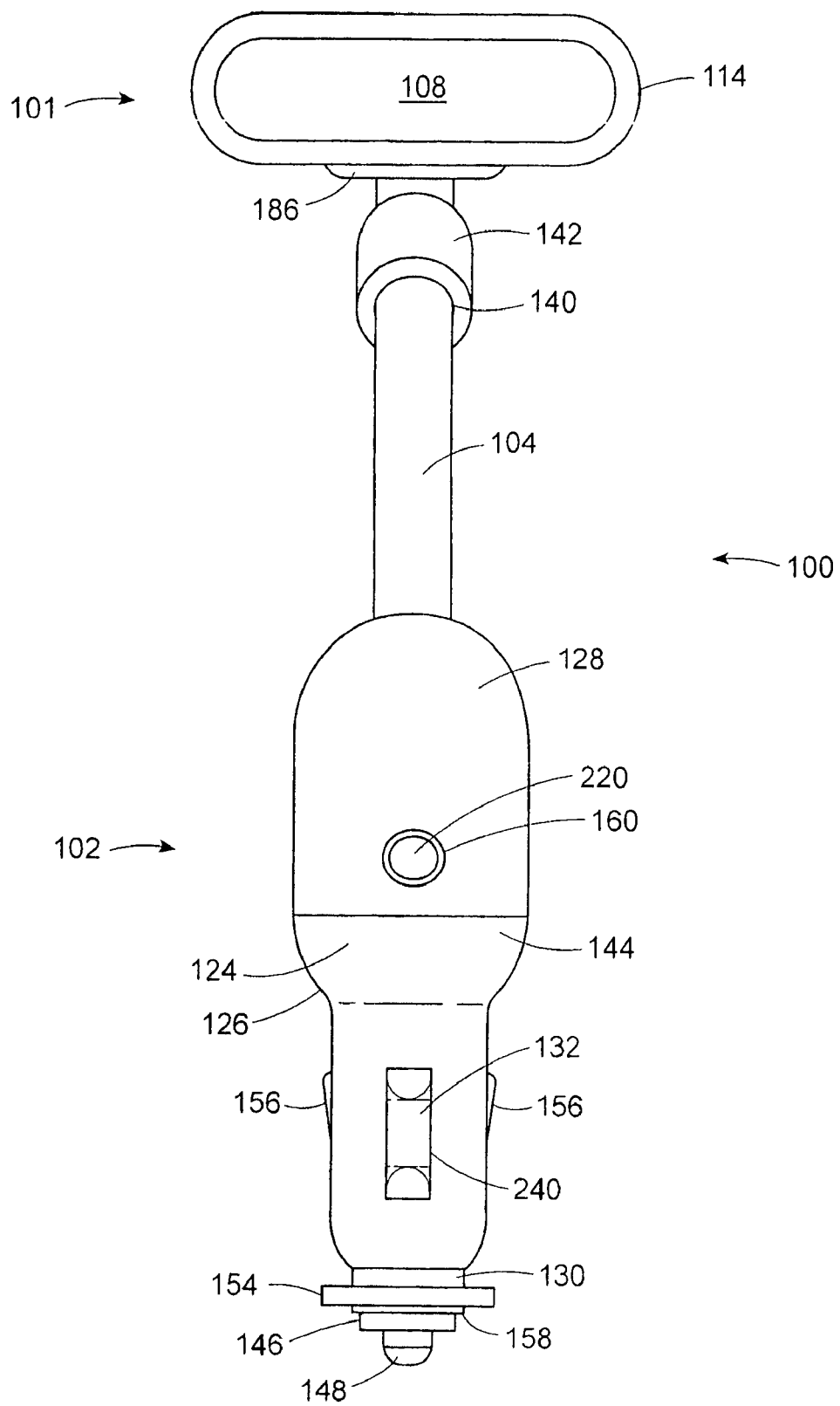
FIG. 8 is a bottom view of the unit, with an iPod mini MP3 player attached.

Swivel connector 142 and connector 104 are hollow, thereby allowing electrical wires to be run through them, e.g., from power acquisition sub-unit 102 up to holder 101. Swivel connector 142 is attached to top 140 of connector 104 by any suitable means, e.g., press fitting, screws, adhesive, swaging, or any combination thereof. As best seen in FIG. 5, swivel connector 142 is desirably at an angle 141 (preferably fixed) of approximately 20 degrees to the back of holder 101, although smaller or larger angles may be used in some cases. That angle facilitates positioning the holder (and, therefore, the electronic device) away from the knobs, levers, etc. that are typically on or near the console of a vehicle.

Connector 104 is preferably a gooseneck, which is compliant (or obedient) flexible tubing, and is preferably metallic or metal covered with, e.g., plastic or elastic material on its outside. A gooseneck may be considered to be a coiled layered construction in which adjacent coils overlap but can be moved with respect to each other (in a sense, slide on each other). The gooseneck tends to hold the position into which it is bent (i.e., it is semi-permanently adjustable or repositionable), unless it is bent beyond its limit. The two "layers" of the gooseneck may be considered to have different thicknesses. Thus, the gooseneck has two outer diameters, the outer diameter of the thicker layer and the outer diameter of the thinner layer, which alternate in the gooseneck. In the preferred embodiment of FIG. 1 et seq., the metallic gooseneck is approximately 19.5 centimeters long, its larger outer diameter is approximately 9 millimeters, its smaller outer diameter is approximately 8.2 millimeters, its inner diameter is approximately 4.5 millimeters, the center-to-center spacing between the larger diameter portions is approximately 3.5 millimeters, the longitudinal gap between the larger diameter portions is approximately 1 millimeter, and the material of construction is steel.

The gooseneck must not be so stiff that it cannot be readily repositioned by the user; however, it must be stiff enough to maintain the holder (containing the electronic device) in position with respect to the power acquisition sub-unit after the holder and gooseneck have been put into their desired position. The gooseneck is stiff enough so that a 19.5 centimeter-long section (the length of the gooseneck in the preferred unit for holding an iPod mini MP3 player) when oriented horizontally and fixed at one end can hold a mass of just under about 436 to 486 grams at the other end before deflecting downwardly, i.e., before gravity pulls that weighted end down, away from the horizontal. For comparison, the preferred holder having an FM transmitter inside and holding an iPod mini MP3 player has a total mass of about 200 grams. Thus, the preferred unit has a design safety factor with respect to gooseneck deflection of about 100% (200 grams compared to a minimum deflection-causing mass of about 436 grams).

Goosenecks that can be used in some preferred embodiments of this invention are available in varying dimensions (e.g., outer diameters of 2 millimeter or less to over 16 millimeters). One skilled in the art will know the gooseneck design, dimensions, and materials of construction to select for any particular usage based on the desired length of connector 104, the weight of holder 101 and the electronic device to be held in it, whether the gooseneck is to function as a broadcast antenna and, if so, for what range of radio frequencies.

Figure 15:
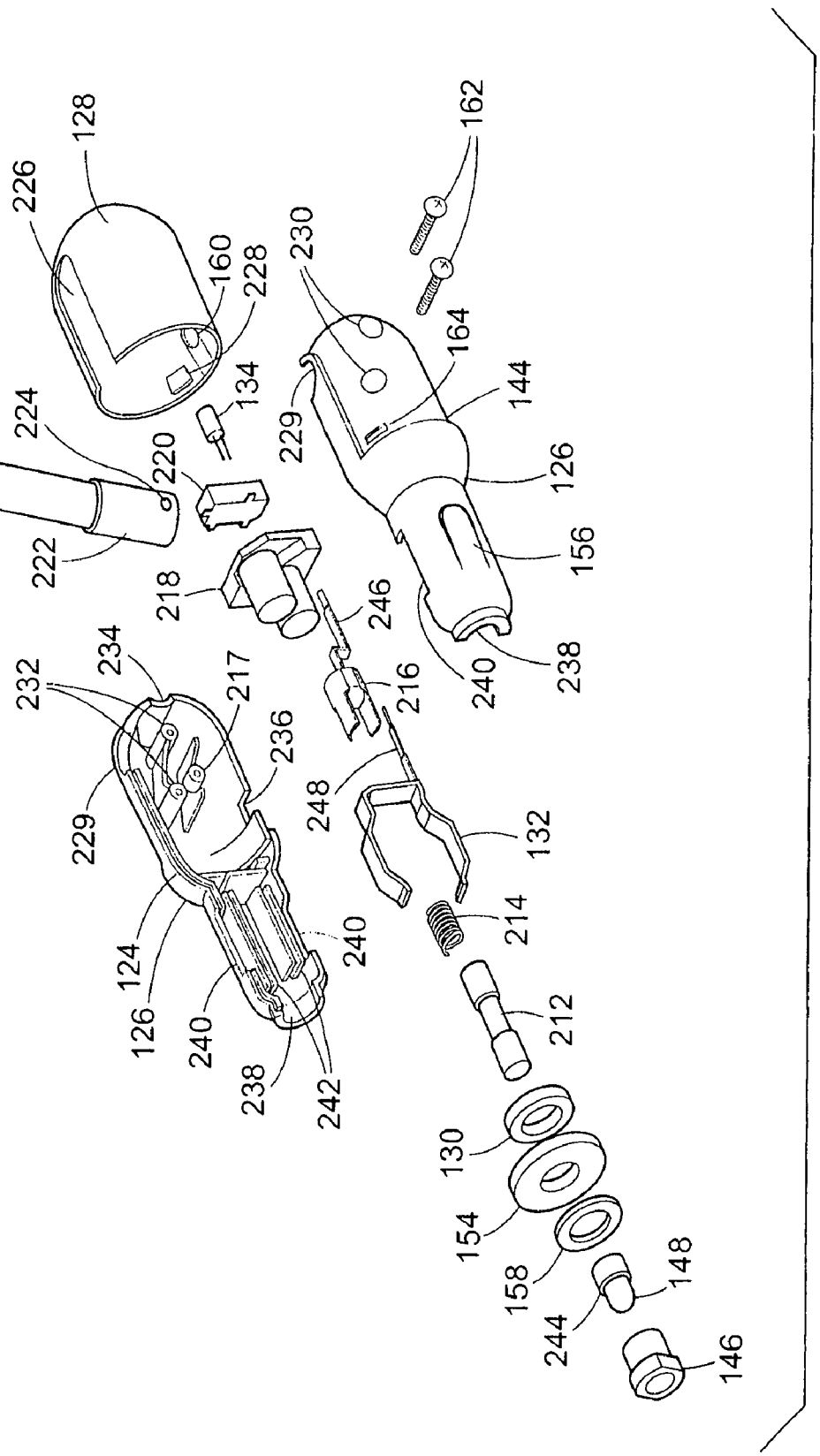
FIG. 15 is an exploded view of the cigarette lighter adapter.
Figure 16:
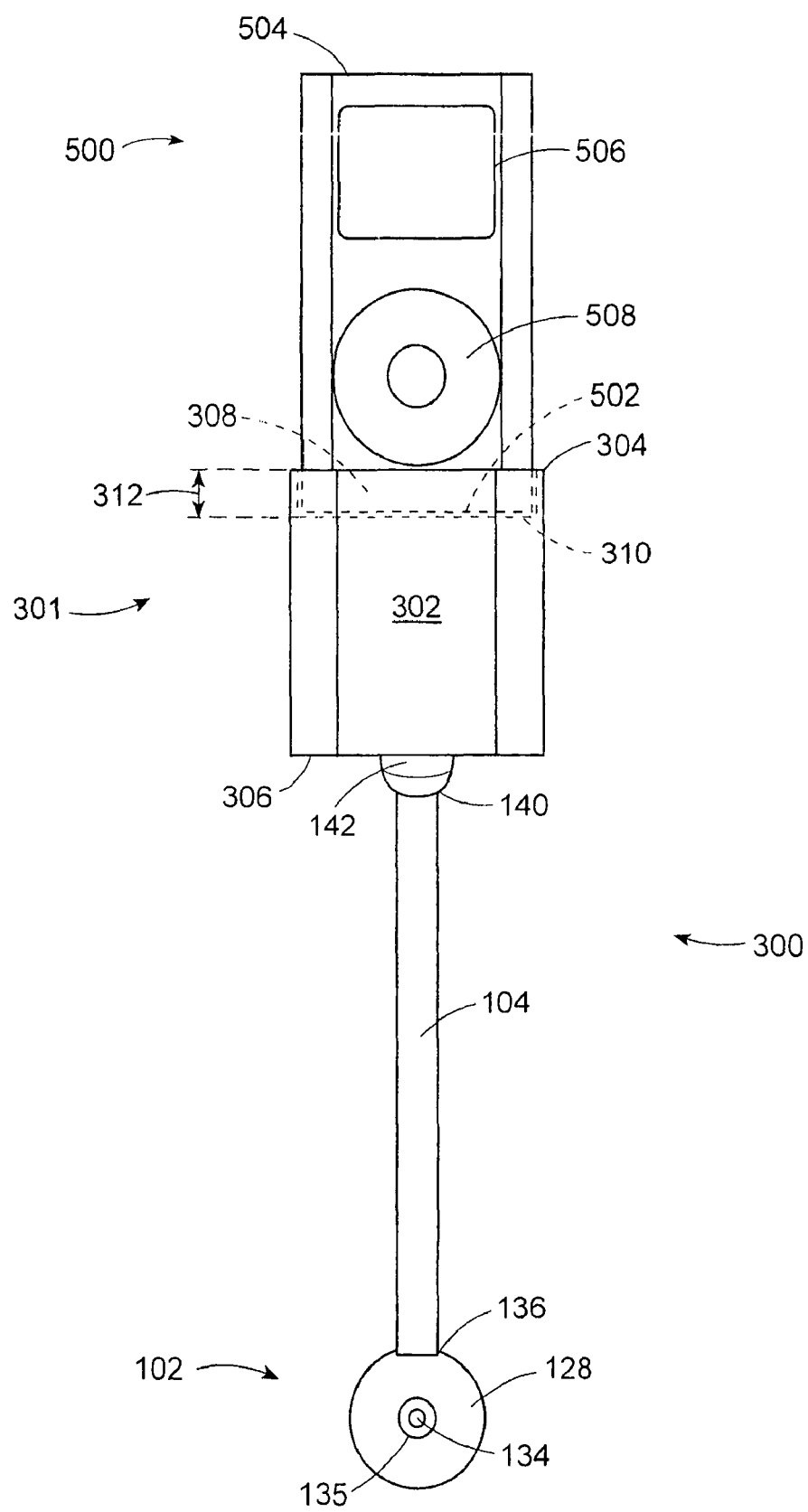
FIG. 16 is a front elevational view of a second preferred embodiment of the present invention, with an iPod mini MP3 player attached, which embodiment supplies power to the iPod mini MP3 player but does not contain an FM transmitter, the audio output being available, e.g., via a jack in the cigarette lighter adapter.
Figure 17:
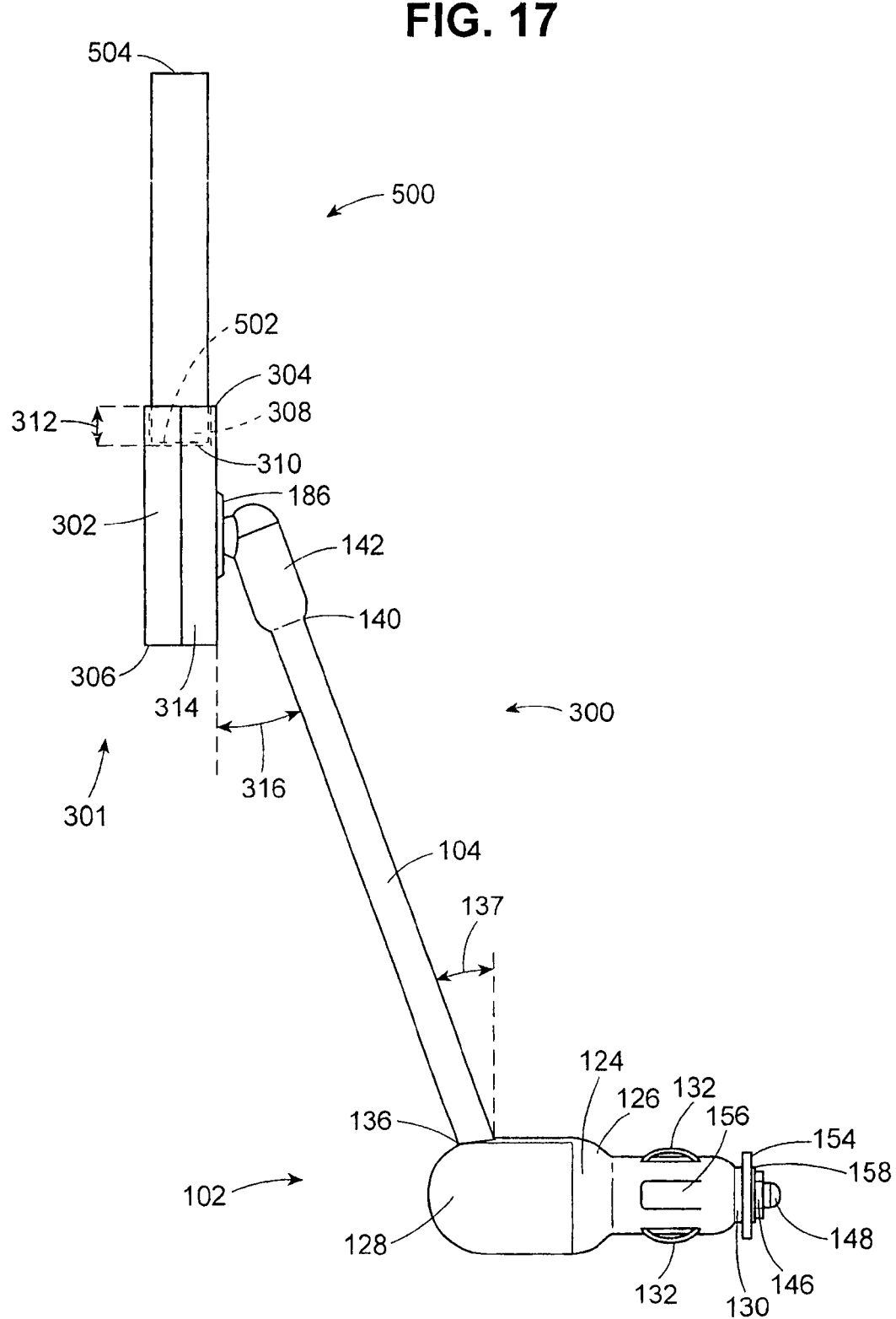
FIG. 17 is a right-side elevational view of the unit of FIG. 16, with an iPod mini MP3 player attached.
Figure 18:
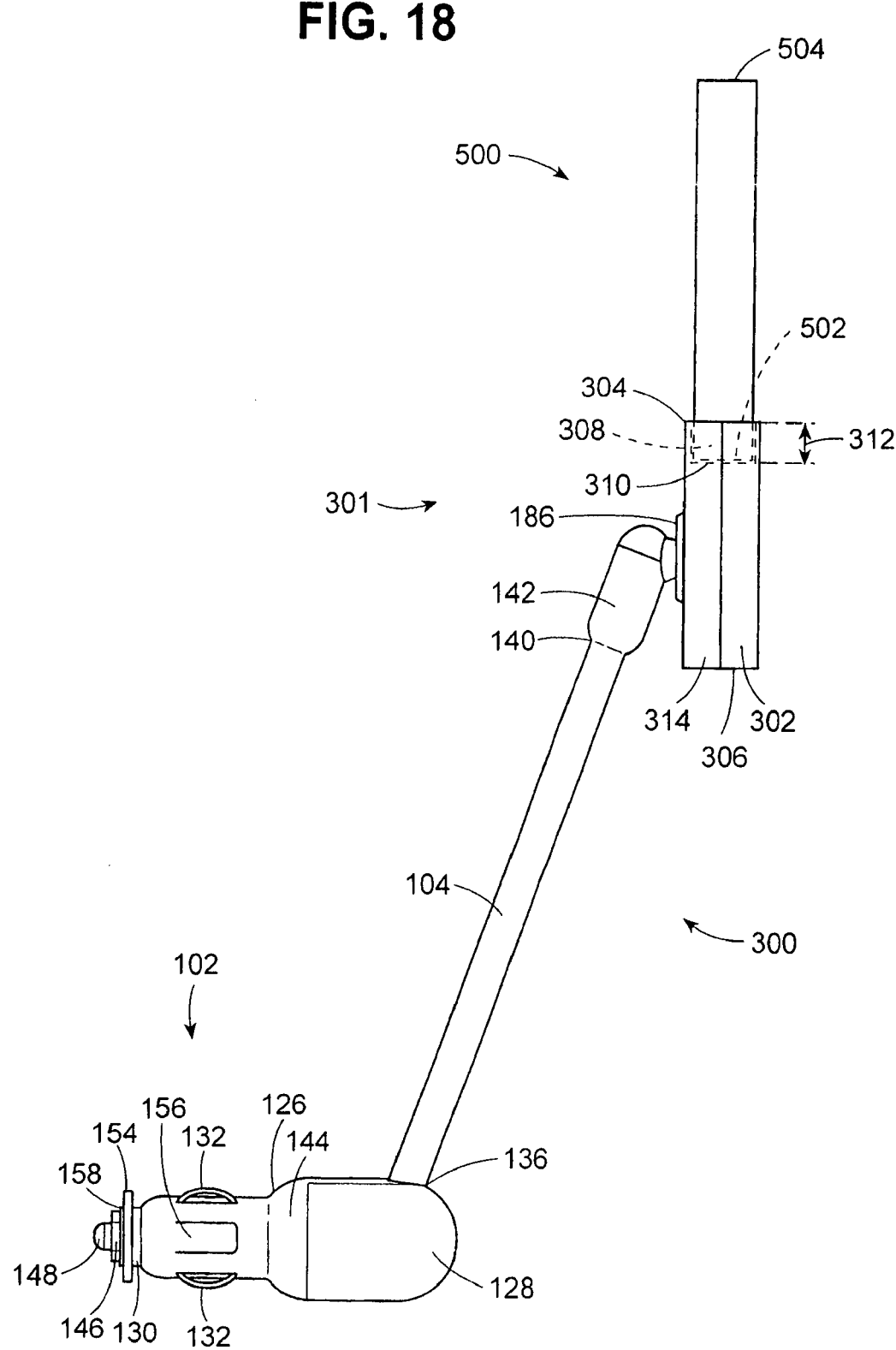
FIG. 18 is a left-side elevational view of the unit of FIG. 16, with an ipod mini MP3 player attached.
Figure 19:
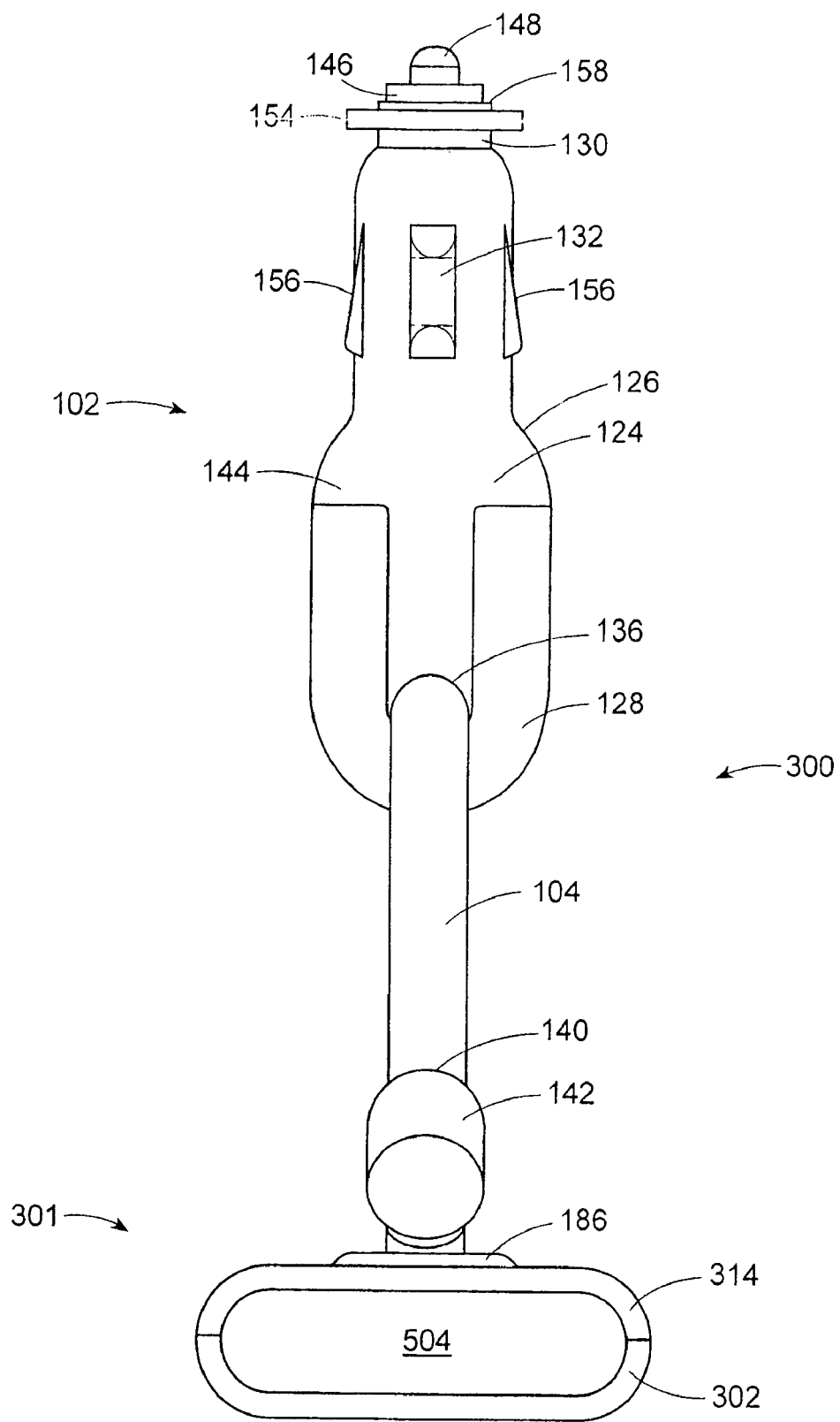
FIG. 19 is a top view of the unit of FIG. 16, with an iPod mini MP3 player attached.

With reference also to FIG. 15, the bottom of connector 104 is press-fit or swaged into swage 222 (connector 104 into put into swage 222, which is then radially compressed to tighten it around connector 104). Two oppositely disposed screw holes 224 (only one of which is visible in FIG. 15) in swage 222 mate with two pins 217 (only one of which is visible in FIG. 15), one in each side of the power acquisition sub-unit, i.e., right side 124 and left side 144. That keeps connector fixed in power acquisition sub-unit 102, both longitudinally and rotationally (connector 104 is also fixed both longitudinally and rotationally in swivel connector 142). In the preferred embodiment being described, swage 222 is about 1.8 centimeters long and has an inner diameter of about 9 millimeters, and outer diameter of about 1.1 centimeters in its lower half (the upper half, which has been radially compressed to tighten it around the bottom of connector 104, has a slightly smaller outer diameter).

Because of the rotational play (allowable movement; in this case, inherently allowable movement) in the coil of gooseneck 104, in the preferred unit, holder 101 is able to rotate around the axis of the gooseneck at least about 90 degrees in each direction (i.e., clockwise and counterclockwise when viewed from above) from the straight-ahead position shown in FIGS. 2 through 8. That is more than sufficient to allow the front of the holder with the electronic device held therein (as in those figures) to be rotated for ease of viewing and use by the driver of the vehicle or by a passenger in the front seat of the vehicle.

Power acquisition sub-unit 102 comprises two housing pieces (right side 124 and left side 144 of cigarette lighter adapter enclosure) and end cap 128. In this embodiment, the internal cavity formed by the two sides being joined contains the circuitry for obtaining power from an external power source such as a cigarette lighter and then processing it (further described below) before it is sent to the RF transmitter and/or the electronic device. As readily seen in FIG. 5, the housing has a smaller diameter portion and a larger diameter portion, with flange 126 in between and defining the end of the larger housing portion adjacent the smaller diameter portion. As will be described below, the flange limits the longitudinal amount of the power acquisition sub-unit that can be inserted into a power source such as a cigarette lighter if some part of the flange is of larger diameter than the corresponding part of the power source.

When right side 124 and left side 144 are joined (as in, e.g., FIG. 1), swage 222 is held in the inner cavity formed by the assemblage of the two sides and connector 104 passes up through circular alignment opening 229. One half (semi-circle) of opening 229 is at the top, near the proximal end, of each of sides 124 and 144. Two sets of two raised members project from the inner surface of each of right side 124 and left side 144 into the inner cavity, one set of members on each side. There are two sets of two corresponding concave semi-circular cut-outs, one cut-out at the end of each of the four members. When the two sides 124 and 144 are brought together, they form two circular holes that receive and hold the outer cylindrical surface of swage 222. The members (and therefore the cut-outs) are positioned such that swage 222 is held at an angle of elevation of approximately 70 degrees with respect to the longitudinal axis of the power acquisition sub-unit, which causes visible bottom 136 of connector 104 to exit through alignment opening 229 at complementary angle 137 (FIG. 5) of approximately 20 degrees declination with respect to a normal (i.e., a line perpendicular) to the longitudinal axis of the power acquisition sub-unit. Angles smaller or larger than 20 degrees may be used in some cases. Having connector 104 at such an angle (e.g., 20 degrees) facilitates positioning holder 101 (and, therefore, the electronic device) away from the knobs, levers, etc. that are typically on or near the console of a vehicle.

The inner cavity of the power acquisition sub-unit contains the circuitry for obtaining power from an external power source such as that found in a vehicle. One electrode comprises tip 148 (see also FIG. 9), which passes through opening 238 at the distal end of the power acquisition sub-unit and has enlarged integral collar or flange 244. The flange defines a cavity into which the distal end of fuse 212 resides after assembly (so as to be electrically coupled to tip 148), and the proximal end of the fuse contacts the distal end of tensioning spring 214, the other end of which spring resides between the two parallel legs of fuse contact 216 and electrically contacts the short spacing member between the two legs. Fuse contact 216 may be made of copper or of any other suitable conductive material. Fuse contact 216 terminates in connection arm 246, which is electrically coupled to printed circuit board 218. Tensioning spring 214 can move longitudinally (i.e., along the major axis of the power acquisition sub-unit) and biases tip 148 outwardly (i.e., against contact 149 when the power acquisition sub-unit has been inserted fully into the power source, e.g., cigarette lighter (FIG. 11), to help insure good electrical coupling of the power acquisition sub-unit with the power source.

The other electrode comprises two contact springs 132, which are joined and terminate in connection arm 248, which is also electrically coupled to printed circuit board 218. The contact springs desirably are made of any suitably springy conductive material, e.g., plated brass, steel, or copper. The two contact springs extend beyond the outer diameter of the distal end of the power acquisition sub-unit (see also FIGS. 2 and 3) through rectangular openings 240 (see also FIGS. 7 and 8), which are formed by corresponding rectangular cut-outs in each of sides 124 and 144.

The processing of the electrical power by printed circuit board 218 in this embodiment is described below. After processing the power, it is sent by wires (not shown) connected to the printed circuit board that pass through swage 222 and connector 104 to the electronic device (iPod mini MP3 player 500) and/or the circuitry on printed circuit board 170 in holder 101 (FIG. 22), e.g., RF transmitter.

The smaller diameter section of the power acquisition sub-unit may be inserted into an external power source such as the cigarette lighter of a vehicle, which are usually cylindrical cavities. To help position and stabilize the power acquisition sub-unit in such a cavity, non-conductive stabilizing springs 156 are provided on opposite side of the smaller diameter portion of the power acquisition sub-unit (see FIGS. 5, 7, and 15). Springs 156 may be cantilevered tabs formed by making three cuts along the housing wall and having the tabs be thicker than the other parts of the wall so that they extend farther from the longitudinal axis of the power acquisition sub-unit. Any other suitable biasing means may be used.

Because springs 156 may be insufficient to stabilize the power acquisition sub-unit in all of the various size cigarette lighters that are found in vehicles, and particularly because of the cantilevered weight of the electronic device, holder, and connector (e.g., gooseneck), stabilizer 154 is used. As will be further described below, stabilizer 154 preferably comprises a deformable resilient member that is larger than the inner circumference of essentially all known vehicle cigarette lighters so that pushing the distal end of the cigarette lighter adapter into the cigarette lighter causes the outer circumference of the deformable resilient member to bend away from the distal end of the cigarette lighter adapter and towards the proximal end of the cigarette lighter adapter while at least some of the deformable resilient member even after such deformation continues to push against the inner circumference of the cigarette lighter. Stabilizer 154 is held near the distal end of the power acquisition sub-unit between collar 130 and retaining washer 158. All of them are locked in place longitudinally by nut 146, which has a center hole to allow electrode tip 148 to pass through and external threads on its smaller diameter rear portion that mate with internal threads in opening 238 at the distal end of the power acquisition sub-unit. Light-emitting diode 134, the leads of which are connected to printed circuit board 218 and the light from which is visible through opening 135 (see FIG. 2), indicates when power is being obtained by the power acquisition sub-unit. Light-emitting diode 134 is held in opening 234 at the proximal end of the power acquisition sub-unit (FIG. 15), opening 234 aligning with opening 135 at the proximal end of end cap 128 (FIG. 2) so that light from the light-emitting diode will be visible.

The two sides 124 and 144 of the cigarette lighter adapter of power acquisition sub-unit 102 have grooves and raised portions to help align them (e.g., slots 242) as they are brought together for assembly. Two screws 162 pass through holes 230 in left side 144, into the internal cavity of the power acquisition sub-unit, and into two corresponding threaded receiving cavities 232 in right side 124, so that tightening the two screws tightly affixes sides 124 and 144 together. Proximal end cap 128 slides onto the proximal end of the power acquisition sub-unit and four tabs 228 (only one of which is shown) near the circular edge of end cap 128 snap into retaining slots 164 (only one of which is shown) on the recessed (lowered) portion of the proximal end of the power acquisition sub-unit. That holds the end cap on the assemblage of the two sides 124 and 144 (thereby helping to hold the two sides together and present a neat appearance). Various openings in end cap 128 are provided, e.g., gooseneck swage receiving slot 226, audio output access opening 160 (which when the end cap is in place aligns with opening 236 in the housing formed by right side 124 and left side 144) through which audio output jack 220 is accessible (see FIG. 8), and opening 135 in the rounded end of the end cap through which the proximal end of light-emitting diode 134 is visible (see FIG. 2).

Figure 9:
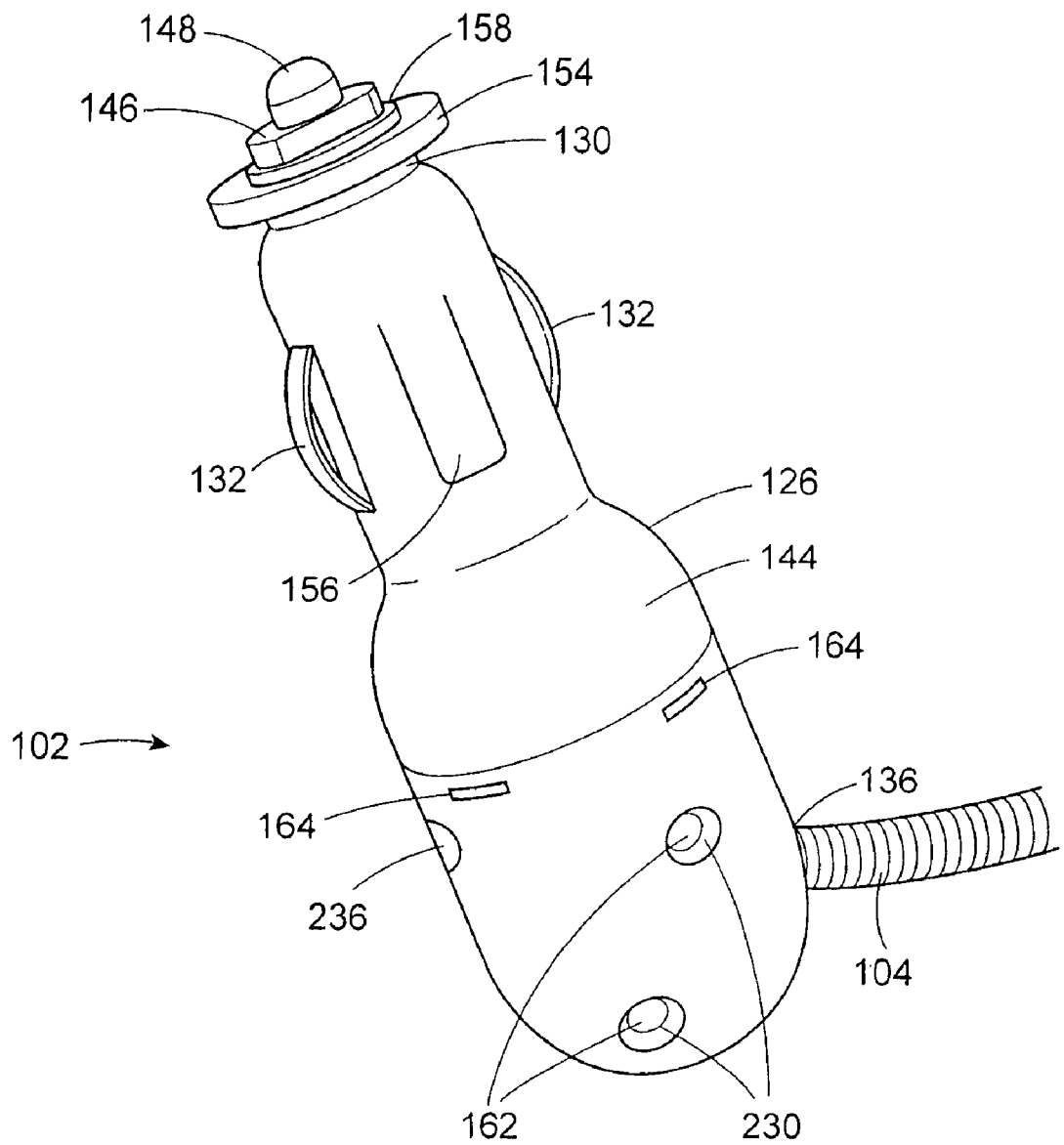
FIG. 9 is a close-up view of the power acquisition sub-unit (which comprises a cigarette lighter adapter) of the unit with part of its outer housing (end cap) removed.

FIG. 9 shows the assemblage of the two sides of power acquisition sub-unit 102, with connector (gooseneck) 104 attached but before end cap 128 is in place. Nut 146 has been tightened so that tip 148 (which comprises the first electrode) extends beyond the front face of the nut and so that stabilizer 154 is held tightly between retaining washer 158 and collar 130 and along the longitudinal axis of the power acquisition sub-unit. The three cuts to provide one of the non-conductive springs 156 are visible, as are the two conductive springs 132, which comprise the second electrode. Screws 162 in holes 230 help keep the two sides 124 and 144 together (see also FIG. 15).

Figure 10:
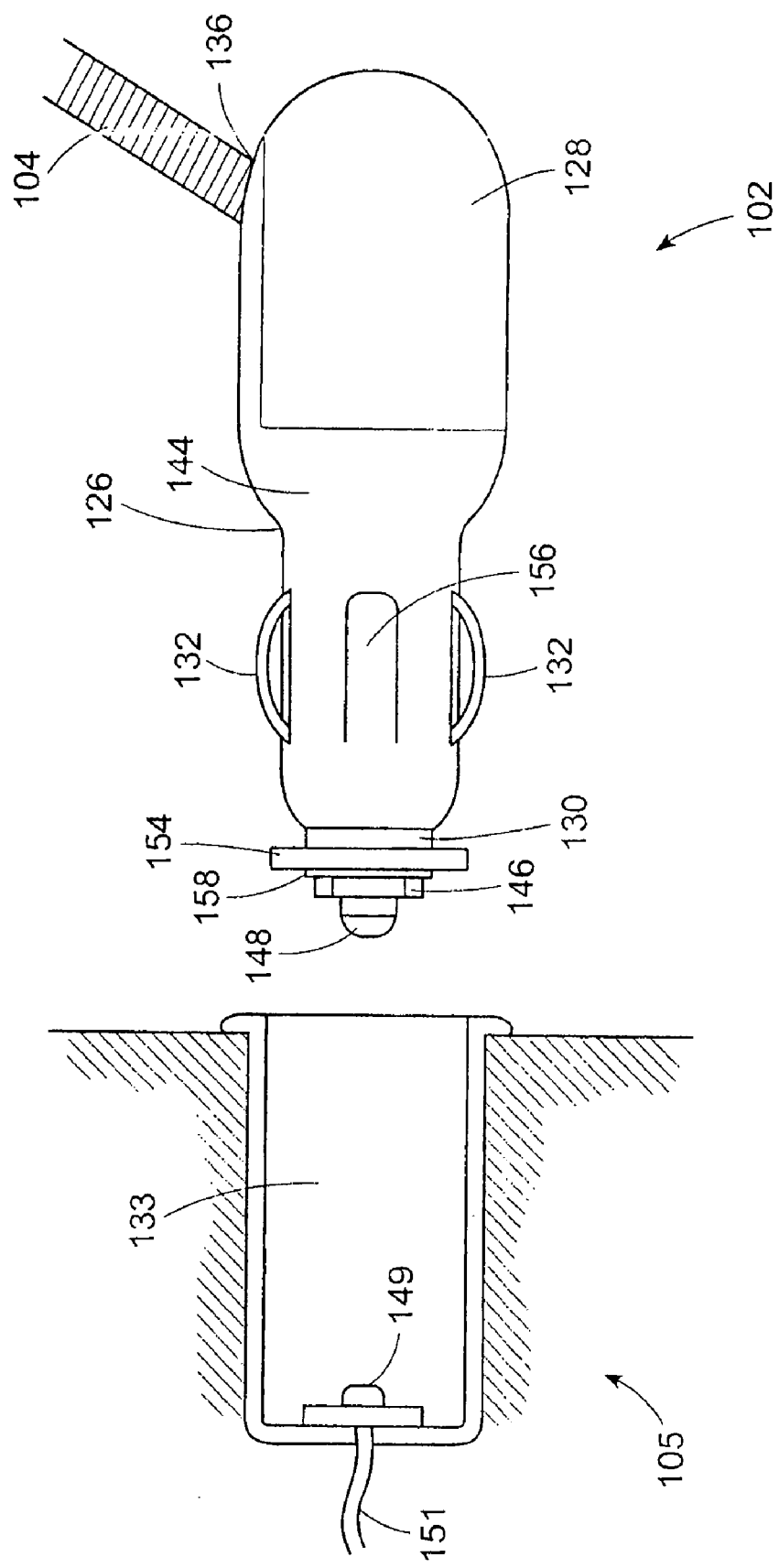
FIG. 10 shows the cigarette lighter adapter just prior to insertion of its distal end into the cigarette lighter of an automobile (i.e., an external source of power)

The preferred power acquisition sub-unit has the following approximate dimensions (see FIGS. 9, 10, and 15). The overall length (from the distal end of tip 148 to the proximal rounded end of end cap 128) is about 9.5 centimeters. End cap 128 is about 3.8 centimeters long and 3 centimeters in outer diameter, and its slot 226 is about 3 centimeters long and 1 centimeter wide. Flange 126 is about 1 centimeter long (axial length), 3 centimeters in outer diameter at its widest point (its proximal end, where it abuts the distal end of end cap 128), and about 2 centimeters in outer diameter at its narrowest point (its distal end, where it abuts the smaller diameter distal portion of the power acquisition sub-unit). The recessed portion of the proximal end of the power acquisition sub-unit is recessed about 2 millimeters, to account for the thickness of end cap 128 so that the outer surface of end cap 128 will lie flat with the non-recessed portion of the proximal end of the sub-unit when the end cap is in place. The distal portion (smaller diameter part) of the sub-unit is about 3.2 centimeters long and about 2 centimeters in outer diameter. Collar 130 is about 3 millimeters long or thick (axial length) and about 1.5 centimeters in outer diameter. Stabilizer 154 is about 2.35 centimeters in outer diameter and about 2 millimeters long or thick (axial length); its center hole has a diameter of about 9 millimeters, which allows the stabilizer to fit over the smaller diameter, proximal, threaded portion of nut 146. Retaining washer is about 1.3 centimeters in outer diameter and about 1 millimeter long or thick (axial length). The portion of nut 146 that is visible in the assembled sub-unit (the larger diameter, distal portion) is about 1.2 centimeters in outer diameter, with two oppositely disposed straight sides to provide purchase for a tightening tool, e.g., pliers (see FIG. 15), and about 4 millimeters long or thick (axial length). Without longitudinal compression of spring 214, tip 148 extends beyond the distal surface of nut 146 about 5 millimeters.

Figure 11:
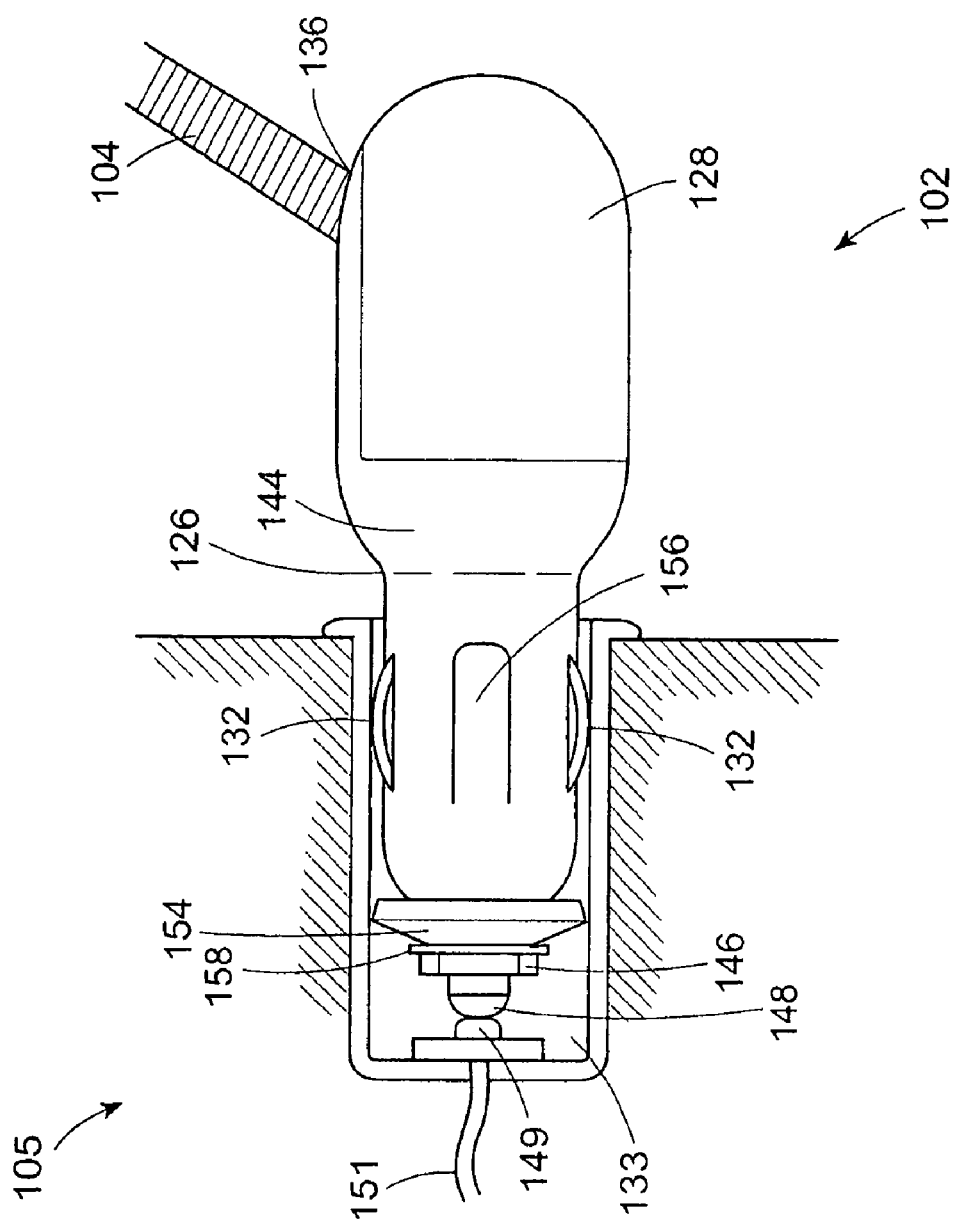
FIG. 11 depicts the unit's cigarette lighter adapter after its distal end has been fully pushed into the cigarette lighter.

With reference also to FIG. 11, one of the features of this invention is the stabilizer, which allows the power acquisition sub-unit to fit the cigarette lighter of virtually any vehicle to mechanically and electrically semi-permanently (firmly but removably) couple the unit of this invention to keep the unit in the desired position and maintain good electrical contact with the power source. The stabilizer retards or prevents undesired rotation, wobbling, and longitudinal movement of the power acquisition sub-unit in the cigarette lighter. Thus, the stabilizer tends to prevent normal vibration, centrifugal forces (from the vehicle's turning), and bumps in the road from moving the unit (and therefore the electronic device) from its desired position.

FIG. 10 shows power acquisition sub-unit 102 poised to be pushed into power receptacle 105 (like a vehicle's cigarette lighter), which comprises cylindrical conductive ground sleeve 133 and contact 149, which is coupled to power lead 151. Stabilizer 154 is substantially flat, i.e., a plane contains its major face, including its outer circular circumference and its central region. Stabilizer 154 is fixed at its central region along the longitudinal axis of the power acquisition sub-unit so that it (e.g., its outer circumference) is generally perpendicular to the length of the housing. Accordingly, when the power acquisition sub-unit is pushed into the power receptacle (as in FIG. 11), the central portion of stabilizer 154 does not move because collar 130 etc. keep the central portion from being forced back towards the proximal end, which in FIG. 11 is to the right.

Because stabilizer 154 is flexible, as the stabilizer is pushed into the power receptacle, it deforms, i.e., its central portion remains fixed in position but its outer periphery is bent back away from the distal end and towards the proximal end (FIG. 11). Furthermore, because stabilizer 154 is also resilient, because it and ground sleeve 133 are round, and because the stabilizer is of larger diameter than the ground sleeve, a circular portion of the stabilizer (away from its central portion) pushes against the ground sleeve 133 around all 360 degrees of the ground sleeve's inner surface. That helps keep the power acquisition sub-unit's longitudinal axis aligned with the longitudinal axis of the ground sleeve, thereby helping to keep tip 148 axially aligned with the receptacle's inner contact 149. Because of the friction between the stabilizer and the inner surface of the ground sleeve (in addition to the friction between stabilizing springs 156 and the ground sleeve), the stabilizer helps keep the power acquisition sub-unit (and therefore the unit) from sliding out of the receptacle. Moreover, the longitudinal spacing between the points of contact of the sleeve and stabilizer, on the one hand, and the points of contact between the sleeve and non-conductive springs 156 and ground contact springs 132, on the other hand, help keep the power acquisition sub-unit from wobbling. That is why the stabilizer is desirably located farther from rather than closer to springs 156 and 132. Both of those features (no sliding and no wobbling) help to keep tip 148 in contact with the receptacle's inner contact 149. The stabilizer cannot rotate easily on the power acquisition sub-unit because it desirably is held tightly between collar 130 and retaining washer 158. That in combination with the friction between the sleeve and the stabilizer helps prevent rotation of the power acquisition sub-unit (and, therefore, the electronic device).

When the power acquisition sub-unit is pulled out of the power receptacle, stabilizer 154 will not be moved distally (i.e., towards the distal end) or pulled off and left behind because retaining washer 158 helps hold it in place. In other words, the power acquisition sub-unit carries a retainer (washer 158) between the deformable resilient member (stabilizer 154) and the distal end of the power acquisition sub-unit to fix the deformable resilient member in position on the power acquisition sub-unit along its length.

Because the outer diameter of the stabilizer is greater in at least one place than the inner diameter of the sleeve, the stabilizer allows the power acquisition sub-unit (and therefore the unit of this invention) to be used in the cigarette lighter (power source) of virtually any vehicle. Thus, as noted above, the expression "the outer circumference of the deformable resilient member being larger than the inner circumference of the cigarette lighter" should be broadly understood to mean that at least some (but not necessarily all) of the periphery of the deformable resilient member extends radially beyond at least some of the periphery of the cigarette lighter.

It will be apparent to one skilled in the art that the stabilizer can have any cross-sectional shape (although substantially circular is preferred), any three-dimensional shape, e.g., a conical section, such as a frustum of a cone (although squat cylindrical is preferred), and any size (although larger in outer periphery than the power source cavity, i.e., cigarette lighter cylindrical cavity, is preferred) that allow the benefits of this invention to be achieved. For example, the stabilizer could have radial arms (e.g., like a starfish). The stabilizer should be deformable yet resilient (and with enough stiffness to push firmly against the wall of the power source's concavity and with enough tack to provide sufficient friction against the wall of the concavity). The stabilizer is desirably non-conductive, at least in units in which it would otherwise be electrically coupled with the tip of the power acquisition sub-unit, because the tip is usually in contact with one electrode of the power source, the stabilizer contacts the sleeve when inserted into the power source, and the sleeve is usually the other electrode; the stabilizer should not be electrically coupled to both electrodes. Thus, the material of construction of the stabilizer will usually be polymeric, e.g., elastomeric, such as rubber (e.g., silicone rubber, ethylene-propylene monomer polymers, ethylene-propylene-diene monomer polymers, styrene-butadiene polymers). One preferred stabilizer for use in the preferred power acquisition sub-unit described above is made of silicone rubber having a Shore Durometer value of 80 (Shore A scale) and has the dimensions noted above (i.e., about 2.35 centimeters in outer diameter, about 2 millimeters long or thick (axial length), and a center hole diameter of about 9 millimeters).

FIGS. 16 through 20 concern a second preferred embodiment of the present invention for holding iPod mini MP3 player 500. Cigarette lighter adapter-gooseneck 300 differs from the previously described cigarette lighter adapter-gooseneck-transmitter 100 in that unit 300 does not have a transmitter. Cigarette lighter adapter-gooseneck 300 comprises holder (support assembly) 301, gooseneck 104 (connector), and power acquisition sub-unit 102 (comprising a cigarette lighter adapter), which can be plugged into (i.e., coupled to) cigarette lighter 105 (i.e., an external power source) in the same way power acquisition sub-unit 102 (and unit 100) was plugged in. (For convenience and ease of understanding, parts of unit 300 that are essentially the same as the corresponding parts of unit 100 may have the same reference numerals in FIGS. 16 through 20 as used in FIGS. 1 through 15.) Connector (gooseneck) 104 and power acquisition sub-unit 102 of this unit 300 are essentially the same as in unit 100, except for changes stemming from not having an RF transmitter.

Holder 301 has enclosure front 302 and enclosure back 314, top 304, and bottom 306. Cavity 308, which holds the bottom portion of iPod mini MP3 player 500, has cavity bottom 310, which lies below top 304 the amount indicated as depth 312. Bottom 502 of the MP3 player rests on cavity bottom 310. Holder 301 is connected to gooseneck 104 through swivel connector 142, which is preferably connected to the holder at angle 316 of 20 degrees, and connector 104 is preferably connected to the gooseneck at angle 137 of 20 degrees (a smaller or larger angle can be used for either or both).

Figure 20:
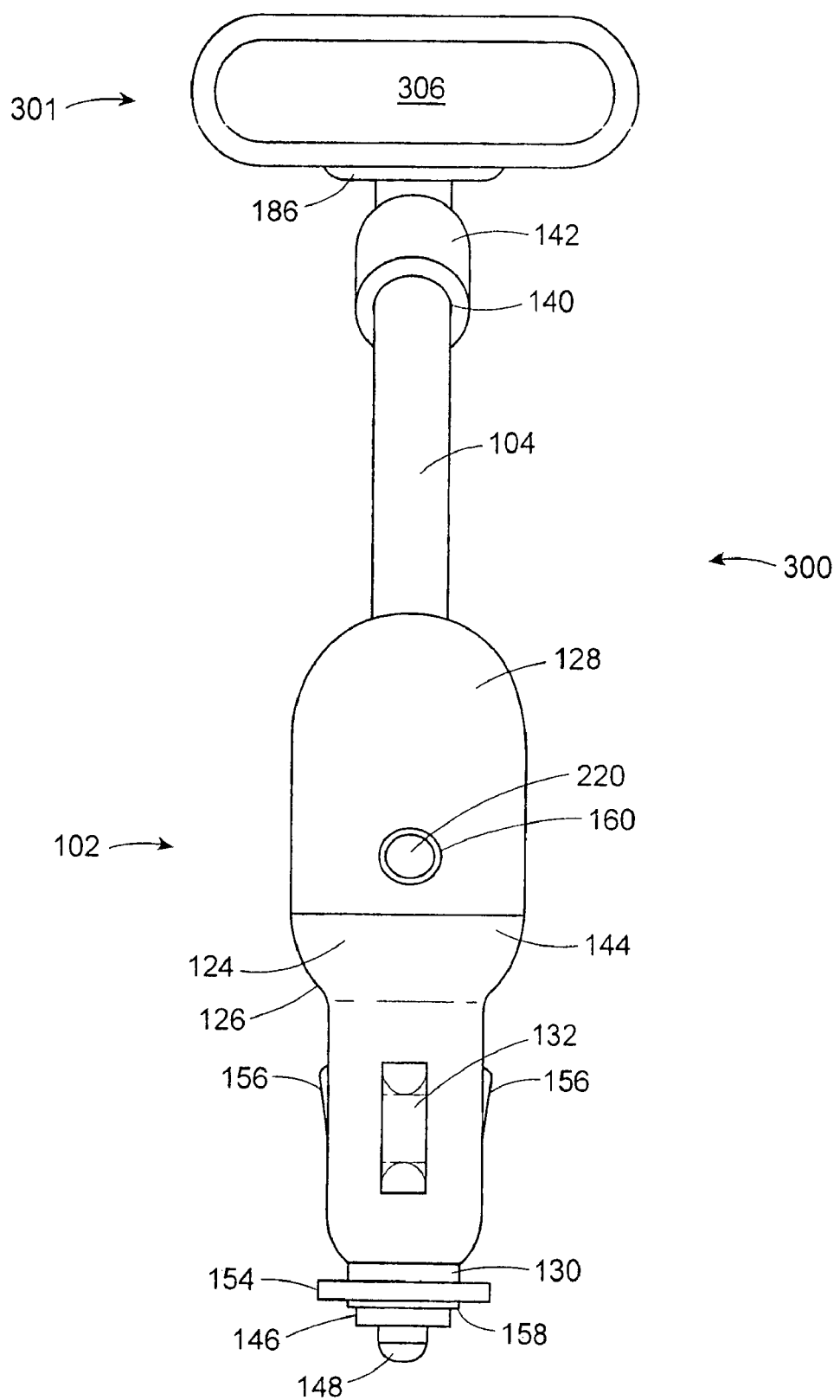
FIG. 20 is a bottom view of the device of FIG. 16, with an iPod mini MP3 player attached.

This embodiment (without the RF transmitter) may be used for embodiments in which an RF transmission system is not needed, e.g., if the electronic device has its own RF transmission system (e.g., a Bluetooth system) and/or if the output data signal is to be made available at an output jack, e.g., output jack 220 (see FIG. 20). Power is still supplied to the electronic device from the external power source (e.g., a vehicle's cigarette lighter) and processed to the extent needed by circuitry in the unit and sent up the gooseneck to holder 301, where it is conveyed to the electronic device through, e.g., a dock connector that mates with a multi-pin connector in the electronic device. The gooseneck allows the position of the holder to be semi-permanently adjusted with respect to the power acquisition sub-unit, and the power acquisition sub-unit functions in this embodiment as in the previous embodiment to securely semi-permanently hold the unit at only one attachment point to the vehicle (i.e., the cigarette lighter) and at the same time supply power to the electronic device.

Figure 21:
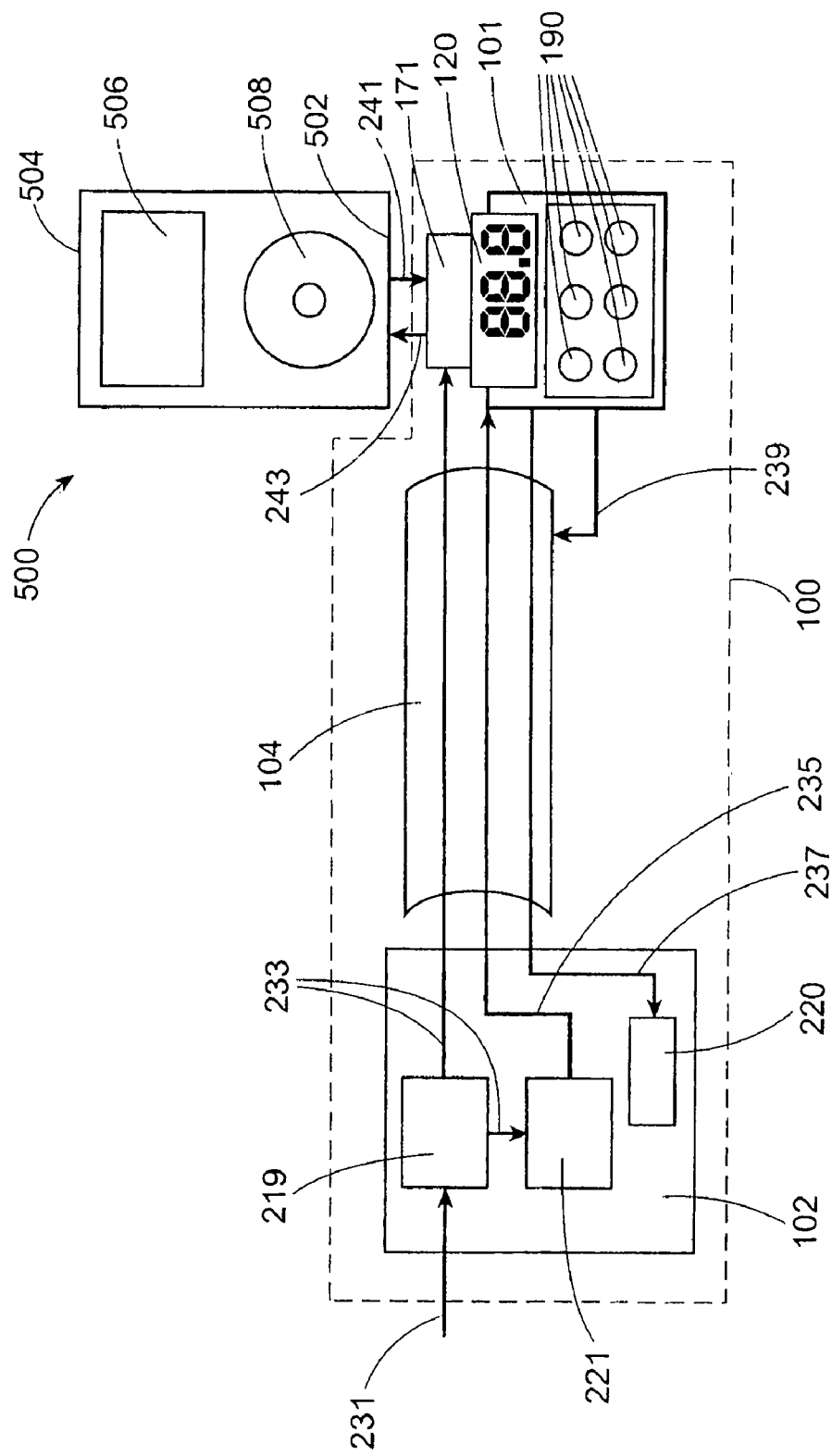
FIG. 21 is a block diagram of the embodiment of FIG. 1, with an iPod mini MP3 player attached.

Turning now to the electrical system (for power and data flow and processing) of preferred cigarette lighter adapter-gooseneck-transmitter 100, FIG. 21 is a basic block diagram of that unit coupled with iPod mini MP3 player 500. Unit 100 of this invention includes power acquisition sub-unit 102, gooseneck 104 (which functions as an adjustable mechanical support, a connector of the power acquisition sub-unit to the holder, a conduit for electrical wires, and an antenna for the RF transmission), and holder 101. Power acquisition sub-unit 102 comprises power conditioning circuit 219, voltage regulator 221, and stereo audio output 220 (e.g., a jack). Holder 101 comprises six momentary pushbutton switches 190, liquid crystal display 120 (which is displaying "88.8," the carrier frequency of the RF transmitter), and dock connector 171.

ipod mini MP3 player 500 is coupled to holder 101 via a dock connector 171. As previously noted, as used herein, the term "couple," "coupled," "couples," "coupling," and the like should be broadly understood and refer to connecting two or more elements or signals, electrically and/or mechanically, either directly or indirectly through intervening circuitry and/or elements. The iPod mini can be coupled to holder 101 by any suitable means, including the use of a serial port, a parallel port, a Universal Serial Bus (USB) port, or by an IEEE (Institute of Electrical and Electronic Engineers) 1394 connection (IEEE 1394 is a standard for a fast external bus that supports high data transfer rates), such as Apple Computer's FireWire connection.

Holder 101 receives data signal 241 from iPod mini MP3 player 500, which becomes data signal 247 inside the holder, and data signal 247 is split, with one branch being sent as signal 237 to the power acquisition sub-unit's stereo audio output 220 (see also FIG. 22). That provides an optional interface to any accessory that utilizes a stereo jack, such as, headphones or a tape cassette adapter, or for a line-input on a stereo audio system.

The other branch of data signal 247 is modulated onto an FM frequency or carrier wave, which is transmitted after attenuation (described below) as signal 239 to a receiver (e.g., a vehicle's FM receiver) through the use of gooseneck antenna 104. The particular frequency onto which data signal 241 is modulated is controlled by the end user (e.g., driver of or passenger in a vehicle) through the use of momentary pushbutton switches 190. The frequency chosen by the end user is shown in the liquid crystal display 120. For example, if the end user chooses to transmit the MP3 player's data signal at 88.8 MHz, then "88.8" will be displayed on the liquid crystal display (as in FIG. 21).

Holder 101 receives operating power from power acquisition sub-unit 102, which in the preferred embodiments described above, comprises a cigarette lighter adapter. However, one of ordinary skill in the art will appreciate that holder 101 can receive operating power (e.g., for its microprocessor and/or RF transmitter) from any suitable power source, including the electronic device held in the holder or from any other external power source. In that case, power could flow down from the electronic device through, e.g., the dock connector, and the power acquisition sub-unit could supply power to the electronic device all the time, some of the time, or possibly not at all, i.e., all power for the unit of this invention could come from the electronic device. Allowing the electronic device to supply power some of the time, e.g., when there was an interruption in the flow of power from the power acquisition sub-unit, would allow the unit to continue to broadcast an RF signal even if there were such a momentary interruption in the power supply from the power acquisition sub-unit.

One skilled in the art will appreciate that if the characteristics of the external power (i.e., the power available from the external power source) do not match the characteristics of the power required for the unit of this invention, the characteristics of the external power will need to be modified before being used. For example, a step-up or step-down voltage regulator may be needed to increase or decrease the voltage of the external power before that power is used in the unit of this invention. Such a voltage regulator may be of any suitable design and may be located within the unit of this invention.

Power conditioning circuit 219 in power acquisition sub-unit 102 receives external power 231 and filters it to remove any extraneous noise. The power conditioning circuit comprises an LC (inductance-capacitance) filter, which receives an input voltage signal between 11-16 volts (e.g., from a car's electrical system). The inductor is approximately 2.0 mH (millihenrys) and the capacitor is approximately 330 μF (microfarads). Because of the limited size of the power acquisition sub-unit's printed circuit board, it is desirable to use as physically small an inductor as possible. The preferred embodiment utilizes such an inductor, which was purchased from Formosa Inductor Corporation, Part No. T9X5X3 (the specifications for this and all other elements are incorporated by reference herein in their entireties).

Output 233 of power conditioning circuit 219 is coupled to voltage regulator 221. Output 235 of voltage regulator 221 is coupled to and used to power the electronics of holder 101 (described in further detail below). Voltage regulation circuits are well-known in the art. In the preferred embodiment, voltage regulator 221 is a low-dropout voltage regulator from Texas Instruments Inc., Part No. TL750L, TL7501L Series. The specific voltage regulator used is a matter of design choice based upon the needs of the particular application. For instance, use of the above-described Texas Instruments voltage regulator was dictated in part by the need to power the holder's printed circuit board 170 (FIG. 22) with 5 volts.

Output 233 of power conditioning circuit 219 is also coupled to dock connector 171 and is used to supply power to iPod mini MP3 player 500 (power supply 243). The MP3 player uses this power to operate and to charge the MP3 player's battery with its own internal charging circuitry. The cigarette lighter adapter-gooseneck-transmitter and cigarette lighter adapter-gooseneck of the present invention preferably do not include circuitry to charge the MP3 player's battery or the battery of any other electronic device.

FIG. 22 is a block diagram of the electronics of the holder of cigarette lighter adapter-gooseneck-transmitter 100. Main printed circuit board 170 is located within holder 101 and comprises stereo modulator and FM transmitter unit (FM transmitter circuitry) 225, liquid crystal display 120, six momentary pushbutton switches 190, microprocessor 223, and attenuation circuit 227. Input power (output 235 from voltage regulator 221—see FIG. 21) is fed to microprocessor 223 and stereo modulator and FM transmitter unit 225.

Stereo modulator and FM transmitter unit 225 receives data signal 247 (which is the iPod mini MP3 player's data output signal 241 that has passed through dock connector 171) and modulates data signal 247 onto an FM frequency or carrier wave. Suitable designs for stereo modulator and FM transmitter are well-known in the art. See, for example, Rohm's Wireless Audio Linx IC, Part No. BH1415F. Accordingly, the design or choice of a particular stereo modulator and FM transmitter is within the ordinary skill in the art and need not be detailed here. Also, as indicated above, and as one of skill in the art will understand, the present invention is not limited to the use of an FM transmitter, but can be used with any type of RF transmitter, including an AM transmitter, Bluetooth transmitter (see, e.g., www.bluetooth.org and www.bluetooth.com), or any other type of suitable RF transmitter.

To comply with FCC (Federal Communications Commission) requirements, output 245 of stereo modulator and FM transmitter 225 (an FM signal) is coupled to attenuation circuit 227. As will be understood by one skilled in the art, the amount of attenuation that is needed to comply with FCC requirements is dictated by the output of the particular FM transmitter, the quality and type of antenna that is being utilized, and the environment in which the FM transmitter is being used. Consequently, the specific design of attenuation circuit 245 is a matter of design choice depending upon the needs of the particular application. For some types of RF signals to be broadcast by an embodiment of this invention, an attenuation circuit will not be needed.

The output of attenuation circuit 227 (attenuated FM data signal 239) is coupled to gooseneck antenna 104, which broadcasts the FM data signal to a stereo receiver. There are numerous benefits to using a metal gooseneck antenna. For example, using the metal gooseneck antenna creates a consistent radiation pattern, which improves the strength of the FM data signal. Broadly speaking, the stronger the FM data signal, the better the sound quality. Other antenna designs, such as having the antenna enclosed in the metal gooseneck or having the antenna within the housing of holder 101, would not generate as consistent a radiation pattern. This is because the gooseneck and iPod mini MP3 player (or other electronic device) would act as metal shields, thereby weakening the strength of the FM data signal. Another benefit of using the gooseneck as an antenna is that it simplifies the design and is cost-effective (because it also acts as a flexible but semi-permanently positionable connector and is relatively inexpensive and aesthetically pleasing).

Microprocessor 223 is coupled to stereo modulator and FM transmitter 225 (digital interface 249), as well as to liquid crystal display 120 and momentary pushbutton switches 190 (bi-directional interface 250). Suitable designs for microprocessor 223 are well known in the art. See, for example, ST's 8-Bit MCU with Flash or ROM Memory, ADC, Two 16-Bit Timers, I²C, SPI, SCI Interfaces, Part Nos. ST722606, ST722626, and ST722646 ("ST" indicates Singapore Technologies, also known as "Singapore Technologies Electronics" and "ST Electronics"), e.g., ST Microcontroller ST72F264G2H1. The specific microprocessor used will be a matter of design choice depending upon the needs of the particular application and is well within the ordinary skill in the art.

As discussed above, an end user can choose, through the use of pushbuttons 168 (which activate momentary pushbutton switches 190) the particular frequency onto which data signal 241 is modulated (e.g., an end user can choose to broadcast or transmit the audio signal at 88.8 MHz). The end user's choice is sent to microprocessor 223, which utilizes this information to control the transmission frequency of stereo modulator and FM transmitter 225. Microprocessor 223 also utilizes this information to display on LCD 120 the frequency the end user has chosen (e.g., "88.8"). Hence the need for bi-directional interface 250 but only a one-way interface between stereo modulator and FM transmitter 225 and microprocessor 223.

FIG. 23 shows a third embodiment in which both the iPod mini MP3 player 500 (electronic device) and FM transmitter (RF transmitter) are semi-permanently held by this invention (both are removable from the holder). Holder 401 has top edge (surface) 402, bottom 403, left side 404, right side 405 and is connected to a gooseneck (not shown) by connector 406, which is similar to the swivel connector of the previously described embodiments (e.g., indicated by reference numeral 142 in FIG. 5). Cavity 407, whose opening is at the top of the holder, receives and semi-permanently holds the bottom portion of iPod mini MP3 player 500, which has bottom 502, top 504, liquid crystal display 506, and control wheel 508. Cavity 411, whose opening is at the bottom of the holder, receives and semi-permanently holds the top portion of FM transmitter 408, which has top 409, bottom 410, left side 414, right side 415, liquid crystal display 412, and pushbuttons 413. (In this and other drawings, the space between the walls of a cavity and an object held therein may be shown as being larger than it would actually be. For example, bottom 502 of iPod mini MP3 player 500 abuts the bottom of cavity 407 but is shown in FIG. 23 spaced therefrom for clarity.)

Holder 401 functions in much the same way as the previously described holders, except that both the electronic device and the RF transmitter are removable. Thus, in one embodiment of holder 401, power is brought up through a power acquisition sub-unit (not shown), which is like those previously described (e.g., power acquisition sub-unit 102 in FIG. 1). The acquired power may be LC filtered and then some of it sent directly to the electronic device and some sent to a voltage regulator (if needed) and from there to the RF transmitter. Alternatively, the acquired power may be LC filtered and then all of it sent to the electronic device, which could then supply power to the RF transmitter. Other schemes may be used.

Both cavities of the holder are shown firmly holding only an end portion of their respective devices (i.e., the bottom portion of the MP3 player and the top portion of the RF transmitter); however, the top and/or bottom portions of the holder may be modified to contact and hold larger portions of the electronic device and/or RF transmitter. For example, cavity 411 of holder 401 may be modified so that it encircles most or all of the periphery of the RF transmitter.

In this embodiment, the 30-pin connector at the bottom the iPod mini MP3 player couples to a dock connector at the bottom (innermost wall) of cavity 407 (neither connector is shown). That dock connector may be the same as or similar to dock connector 171 (best seen in FIGS. 12 and 13). A dock connector at the top of FM transmitter 408 couples to a 30-pin connector at the bottom (innermost wall) of cavity 411 (neither connector is shown). That dock connector may be the same as or similar to dock connector 171, and that 30-pin connector may be the same as or similar to the 30-pin connector used as the bottom of the MP3 player. Thus, power entering holder 401 through connector 406, which power may be already been LC filtered and whose voltage may already have been adjusted, can flow up through the mating connectors into iPod mini MP3 player 500 and down through the mating connectors into FM transmitter 408.

The FM transmission system can operate as in the embodiment of FIGS. 1 through 15. A data (audio) signal leaving iPod mini MP3 player 500 flows down through the two sets of coupled connectors (the first set comprising the 30-pin connector in the bottom of the MP3 player and the mating dock connector in the bottom of cavity 407, and the second set comprising the 30-pin connector in the bottom of cavity 411 and the mating dock connector in the top of FM transmitter 408) into FM transmitter 408, is modulated onto a carrier signal, attenuated (if required), and broadcast by a gooseneck antenna (not shown), which is coupled to the FM transmitter through connector 406. The six pushbuttons 413 allow the carrier frequency to be selected and programmed into pre-sets (the two center pushbuttons adjust the frequency up and down, and the other four pushbuttons control the pre-sets); liquid crystal display 412 shows the carrier frequency to which the FM transmitter is set.

One feature of this embodiment is that both the MP3 player and the FM transmitter can both be removed from the holder and coupled to each other via the 30-pin connector in the bottom of iPod mini MP3 player 500 and the dock connector in the top of FM transmitter 408. The coupled assemblage can then be removed from the vehicle or other environment in which the holder (with coupled power acquisition sub-unit and gooseneck) was being used and placed near another FM receiver, e.g., in a home, office, or another vehicle, so that FM transmitter 408 can broadcast its signal to that second FM receiver.

In this embodiment, power must be supplied to the FM transmitter after it has been removed from its holder 401. For example, it may be plugged into a mating holder in another location (e.g., another vehicle) and draw power through the power acquisition sub-unit associated with the second holder. Alternatively, if plugged directly into the electronic device (e.g., iPod mini MP3 player 500) after the electronic device has also been removed from holder 401, the FM transmitter can draw power from the electronic device. Also, because the gooseneck between the holder and power acquisition sub-unit desirably functions as the broadcast antenna for the FM (RF)

signal, uncoupling the FM transmitter from the holder also uncouples the FM transmitter from its gooseneck antenna. Therefore, another antenna would have to be used, e.g., a wire inside the FM transmitter housing that is used (activated) at the same time the gooseneck is used as the antenna or only when the gooseneck is not being used as the antenna (because the FM transmitter has been removed from the holder).

Variations and modifications of what has been described will be apparent to one skilled in the art. For example, although engineering plastic (e.g., acrylonitrile-butadiene-styrene, polyacrylate, phenolformaldehyde resin, polyethylene, polypropylene, polyphenylene oxide, polycarbonate, polyamide (e.g., nylon), polyacetal, polyurethane, polystyrene, polyvinyl chloride, reinforced plastics, ureaformaldehyde resin, etc.) may be used for the various parts of different embodiments of this invention (e.g., most of the non-metallic parts of the power acquisition sub-unit and the holder), some or all of those parts may also be made of metal or polymers that are not usually considered to be engineering plastics. As another example, the dimensions may be anything suitable for the electronic device of interest. One or more parts of the unit of this invention may be detachable from the other parts.

The claims are intended to cover all variations and modifications that fall within the true spirit and scope of the invention.

The invention claimed is:

1. An accessory unit for an electronic device comprising:
   a radio frequency transmitter to transmit data signals received from the electronic device;
   a holder for the electronic device, the radio frequency transmitter being coupled to the holder, the holder comprising:
     a first connector configured to be coupled to the electronic device;
   a power acquisition unit coupled to the holder and configured to receive power from an external power source; and
   a second connector coupling the holder to the power acquisition unit and configured to radiate radio frequency signals received from the radio frequency transmitter.

2. The accessory unit of claim 1, wherein:
   the first connector comprises:
     a power coupling configured to transmit power received by the power acquisition unit to the electronic device; and
     a signal coupling configured to receive the data signals from the electronic device.

3. The accessory unit of claim 1, wherein:
   the power acquisition unit comprises:
     a deformable resilient member mechanically coupled to an exterior side of the power acquisition unit and configured to be mechanically coupled to the external power source.

4. The accessory unit of claim 3, wherein:
   the deformable resilient member circumscribes a portion of the power acquisition unit.

5. The accessory unit of claim 1, wherein:
   the second connector comprises:
     a semi-rigid elongated portion configured to allow a position of the holder to be semi-permanently adjusted relative to a position of the power acquisition unit.

6. The accessory unit of claim 5, wherein:
   the semi-rigid elongated portion is further configured to radiate the radio frequency signals received from the radio frequency transmitter.

7. The accessory unit of claim 1, wherein:
   the second connector comprises a gooseneck.

8. The accessory unit of claim 7, wherein:
   the gooseneck is configured to radiate the radio frequency signals received from the radio frequency transmitter.

9. The accessory unit of claim 1, wherein:
   the holder comprises:
     a cavity for receiving and releasably holding the electronic device, the cavity being defined by at least a bottom wall and a sidewall; and
   the sidewall is configured to circumscribe a portion of the electronic device.

10. The accessory unit of claim 1, wherein:
    the holder is configured to be rotated three hundred and sixty degrees relative to the power acquisition unit.

11. The accessory unit of claim 10, further comprising:
    a swivel connector coupling the holder to the first connector,
    wherein:
    the swivel connector allows the holder to be rotated the three hundred and sixty degrees relative to the power acquisition unit.

12. The accessory unit of claim 1, wherein:
    the power acquisition unit comprises:
      a cigarette lighter adapter; and
      a deformable resilient member circumscribing a portion of the cigarette lighter adapter.

13. A power acquisition unit configured to acquire electrical power from an external power source for an electronic device, the power acquisition unit comprising:
    one or more electrodes configured to be electrically coupled to the external power source and configured to receive electrical power from the external power source;
    one or more conductors electrically coupled to the one or more electrodes and configured to transmit at least a portion of the electrical power received by the one or more electrodes to the electronic device;
    a housing with an exterior side and enclosing at least a portion of the one or more conductors; and
    one or more springs coupled to the exterior side of the housing; and
    a stabilizer mechanically coupled to the exterior side of the housing,
    wherein:
    the housing is mechanically coupled the one or more electrodes; and the stabilizer comprises a deformable resilient member.

14. The power acquisition unit of claim 13, wherein:
    the stabilizer is configured to be mechanically coupled to the external power source.

15. The power acquisition unit of claim 14, wherein:
    the external power source has a cavity with an opening; and
    the housing and the stabilizer are configured such that the deformable resilient member bends towards the opening of the external power source when the one or more electrodes, the stabilizer, and the at least the portion of the housing are located in the cavity in the external power source.

16. The power acquisition unit of claim 13, wherein:
    the external power source has a cavity with an opening; and
    the one or more electrodes, the stabilizer, and at least a portion of the housing are configured to be located in the cavity in the external power source.

17. The power acquisition unit of claim 16, wherein:
    the stabilizer has an outer circumference;
    the opening in the external power source has an inner circumference; and the outer circumference of the stabilizer is larger than the inner circumference of the external power source.

18. The power acquisition unit of claim 13, wherein:
the housing has a first outer circumference; and
the stabilizer has a second outer circumference greater than the first outer circumference.

19. The power acquisition unit of claim 13, wherein:
the external power source comprises a cigarette lighter; and
the power acquisition unit comprises a cigarette lighter adapter.

20. The power acquisition unit of claim 13, wherein:
the housing has a distal end, a proximal end, and a length running from the distal end to the proximal end;
the stabilizer is coupled to the housing near the distal end;
the housing is configured to be coupled to the external power source at the distal end; and
the housing is configured to be coupled to a connector at the proximal end.

21. The power acquisition unit of claim 20, wherein:
the distal end of the housing is configured to be located inside of the external power source; and
the proximal end of the housing is configured to remain outside the external power source.

22. A unit configured to hold and supply electrical power to an electronic device, the electrical power supplied by a cigarette lighter, the unit comprising:
a holder to hold the electronic device and configured to transmit the electrical power to the electronic device;
a cigarette lighter adapter coupled to the holder and configured to be coupled to the cigarette lighter to supply the electrical power to the holder; and
a connector coupling the holder to the cigarette lighter adapter, the connector configured to allow a position of the holder to be semi-permanently adjusted relative to a position of the cigarette lighter adapter,
wherein:
the cigarette lighter adapter comprises:
a housing with a distal end, a proximal end, and a length running from the distal end to the proximal end, the distal end being adapted for insertion into and positioning within the cigarette lighter; and
one or more springs coupled to the housing; and
a stabilizer coupled to the housing near the distal end such that at least a portion of the stabilizer extends away from the housing.

23. The unit of claim 22, wherein:
the cigarette lighter adapter further comprises a retainer between the stabilizer and the distal end of the cigarette lighter adapter to fix a position of the stabilizer along the length of the cigarette lighter adapter.

24. The unit of claim 22, further comprising:
at least one data signal output connector configured to pass a data output signal from the electronic device to the holder;
a radio frequency transmitter configured to convert the data output signal to a radio frequency signal; and
an antenna for radiating the radio frequency signal.

25. The unit of claim 24, wherein:
the connector comprises a semi-rigid elongated portion; and
the semi-rigid elongated portion comprises the antenna.

26. The unit of claim 24, wherein:
the at least one data signal output connector is located at an exterior of the holder.

27. The unit of claim 22, wherein:
the holder comprises:
a power coupling configured to transmit the electrical power to the electronic device.

28. The unit of claim 22, wherein:
the holder comprises:
a cavity for receiving and releasably holding the electronic device, the cavity being defined by at least a bottom wall and a sidewall; and
the sidewall is configured to fit around the electronic device to help retain the electronic device within the cavity.

29. The unit of claim 22, wherein:
the holder is configured to be rotated at least approximately ninety degrees relative to the cigarette lighter adapter.

30. A holder for an electronic device, the electronic device having a top, a bottom, and a portion extending from the bottom of the electronic device towards the top of the electronic device, the holder comprising:
a housing comprising:
two or more inner housing sections; and
an outer piece that fits over the inner housing sections to hold the two or more inner housing sections in close fitting alignment with each other,
wherein:
the holder has a cavity for receiving and releasably holding the electronic device;
the cavity is defined by at least a bottom wall and a sidewall; and
the sidewall is configured to fit around the electronic device to help retain the electronic device within the cavity.

31. The holder of claim 30, wherein:
the holder comprises a shallow cavity for receiving and releasably holding the bottom portion of the electronic device; and
the holder is configured to hold the electronic device by the bottom portion of the electronic device.

32. The holder of claim 30, wherein:
the sidewall is part of the outer piece; and
the bottom wall comprises two or more parts of the two or more inner housing sections.

33. The holder of claim 30, wherein:
the cavity is defined at least in part by one or more biasing members that are configured to push against the electronic device to help retain the electronic device within the cavity.

34. The holder of claim 30, wherein:
the cavity of the holder has one or more protruding members coupled to the bottom wall and extending away therefrom;
the electronic device has one or more mating concavities, the one or more mating concavities having one or more openings in the bottom of the electronic device; and
the one or more protruding members are configured to extend into the one or more mating concavities of the electronic device when the electronic device is held in the holder.

35. The holder of claim 34, wherein:
one of the one or more protruding members is an alignment pin.

36. The holder of claim 30, wherein:
the cavity of the holder comprises a power coupling for providing power to the electronic device.

37. The holder of claim 30, wherein:
the cavity of the holder comprises:
a power coupling to provide power to the electronic device; and a signal coupling to receive a data signal from the electronic device.

38. The holder of claim 37, further comprising:
a multi-pin connector,
wherein:
the multi-pin connector is either a male multi-pin connector or a female multi-pin connector;
the multi-pin connector is located in the cavity of the holder; and
at least part of the power coupling and at least part of the signal coupling are part of the multi-pin connector.

39. The holder of claim 30, wherein:
the cavity is configured to receive and releasably hold a radio frequency transmitter; and
the cavity electrically couples the radio frequency transmitter to the electronic device.

40. A transmission system configured to wirelessly transmit a data signal and further configured to mechanically couple a holder to a power sub-unit, the transmission system comprising:
a transmitter; and
an antenna comprising a repositionable metallic portion,
wherein:
the antenna is configured to wirelessly transmit the data signal when the antenna receives the data signal from the transmitter;
the repositionable metallic portion mechanically couples the holder to the power sub-unit; and
the repositionable metallic portion comprises a coiled layered construction.

41. The transmission system of claim 40, wherein:
the coiled layered construction of the repositionable metallic portion comprises:
a first layer having a first thickness; and
a second layer having a second thickness different than the first thickness.

42. The unit of claim 22, wherein:
the connector comprises a semi-rigid elongated portion.

43. The unit of claim 42, wherein:
the semi-rigid elongated portion of the connector comprises a gooseneck.

44. The transmission system of claim 40, wherein:
the transmission system is designed to be mechanically and electrically coupled to a vehicle;
the vehicle has an audio system and an electrical system for supporting the transmission system;
the transmission system is configured to draw power from the electrical system of the vehicle; and
the transmission system is configured to transmit a radio frequency signal to the audio system of the vehicle.

45. The transmission system of claim 41, wherein:
the repositionable metallic portion comprises:
a first coil; and
a second coil coupled to the first coil;
the first coil comprises the first layer; and
the second coil comprises the second layer.

46. The transmission system of claim 41, wherein:
the first layer alternates with the second layer in the repositionable metallic portion.

47. The transmission system of claim 41, wherein:
the first and second thicknesses define two different outer diameters of the repositionable metallic portion.

* * * * *